(12) United States Patent  (10) Patent No.: US 7,564,569 B2
Mian et al.  (45) Date of Patent: Jul. 21, 2009

(54) OPTICAL WHEEL EVALUATION

(75) Inventors: Zahid F. Mian, Loudonville, NY (US);
Jeremy C. Mullaney, Troy, NY (US);
Robert MacAllister, Mechanicville, NY (US); Thomas J. Schneider, Nashua, NH (US)

(73) Assignee: International Electronic Machines Corp., Troy, NY (US)

( * ) Notice: Subject to any disclaimer, the term of this patent is extended or adjusted under 35 U.S.C. 154(b) by 218 days.

(21) Appl. No.: 11/324,894

(22) Filed: Jan. 4, 2006

(65) Prior Publication Data

US 2007/0064244 A1 Mar. 22, 2007

Related U.S. Application Data

(60) Provisional application No. 60/717,263, filed on Sep. 16, 2005.

(51) Int. Cl.
*G01B 11/24* (2006.01)

(52) U.S. Cl. ................. 356/601; 356/614; 356/635; 250/559.22

(58) Field of Classification Search ... 356/237.1–237.5, 356/601–614, 625; 250/559.22, 559.24
See application file for complete search history.

(56) References Cited

U.S. PATENT DOCUMENTS

| | | | |
|---|---|---|---|
| 3,820,016 A | 6/1974 | Gieskieng | |
| 4,407,072 A | 10/1983 | Hoskins, Jr. | |
| 4,798,963 A | 1/1989 | Wittkopp et al. | |
| 4,798,964 A | 1/1989 | Schmalfuss et al. | |
| 4,904,939 A | 2/1990 | Mian | |
| 4,932,784 A | 6/1990 | Danneskiold-Samsoe | |
| 5,133,521 A * | 7/1992 | Gutauskas | 246/169 R |
| 5,193,120 A | 3/1993 | Gamache et al. | |
| 5,247,338 A | 9/1993 | Danneskiold-Samsoe et al. | |
| 5,636,026 A | 6/1997 | Mian et al. | |
| 5,745,237 A * | 4/1998 | Yahiro et al. | 356/615 |
| 5,767,973 A * | 6/1998 | Naumann | 356/602 |
| 5,793,492 A | 8/1998 | Vanaki | |
| 5,808,906 A | 9/1998 | Sanchez-Revuelta et al. | |
| 5,936,737 A | 8/1999 | Naumann | |
| 6,233,050 B1 * | 5/2001 | Lopez Gomez et al. | 356/635 |
| 6,768,551 B2 | 7/2004 | Mian et al. | |
| 6,862,936 B2 * | 3/2005 | Kenderian et al. | 73/636 |
| 6,909,514 B2 | 6/2005 | Nayebi | |

FOREIGN PATENT DOCUMENTS

GB 2 183 840 A 6/1987

* cited by examiner

*Primary Examiner*—Sang Nguyen
(74) *Attorney, Agent, or Firm*—Hoffman Warnick LLC

(57) ABSTRACT

A solution for optically evaluating a wheel along at least one circumference of the wheel is provided. Image data is obtained while the wheel moves along a path having a length of at least one circumference of the wheel. The path and/or wheel can be illuminated to enhance the resulting image data. One or more attributes of the wheel are measured based on the image data. The attributes can then be used to detect one or more defects in the wheel. In one embodiment, the wheel is a rail wheel, and a rail segment is illuminated. The rail can be specially configured to enhance a contrast between the rail and the rail wheel and/or to provide a consistent path for the rail wheel to travel.

24 Claims, 18 Drawing Sheets

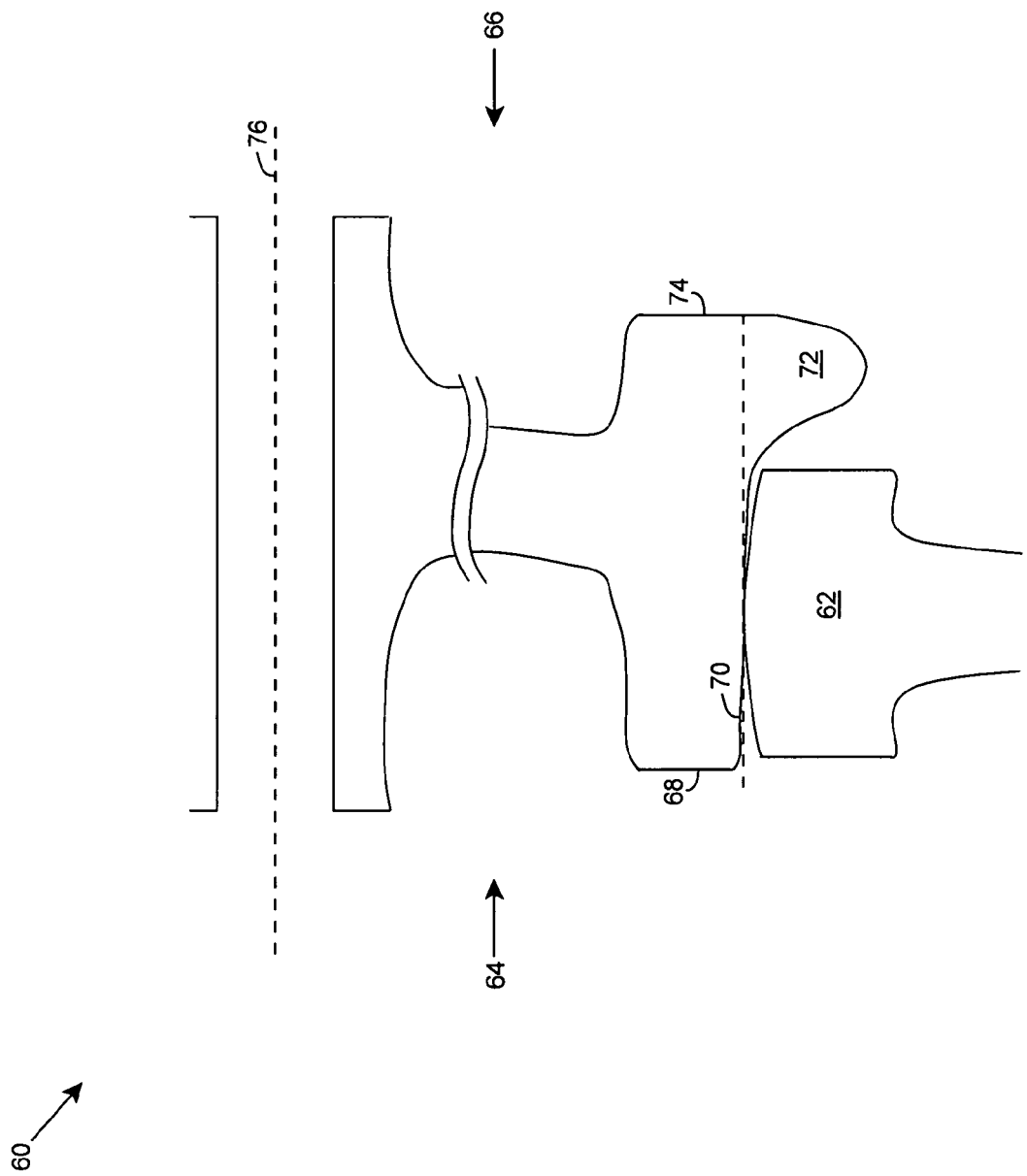

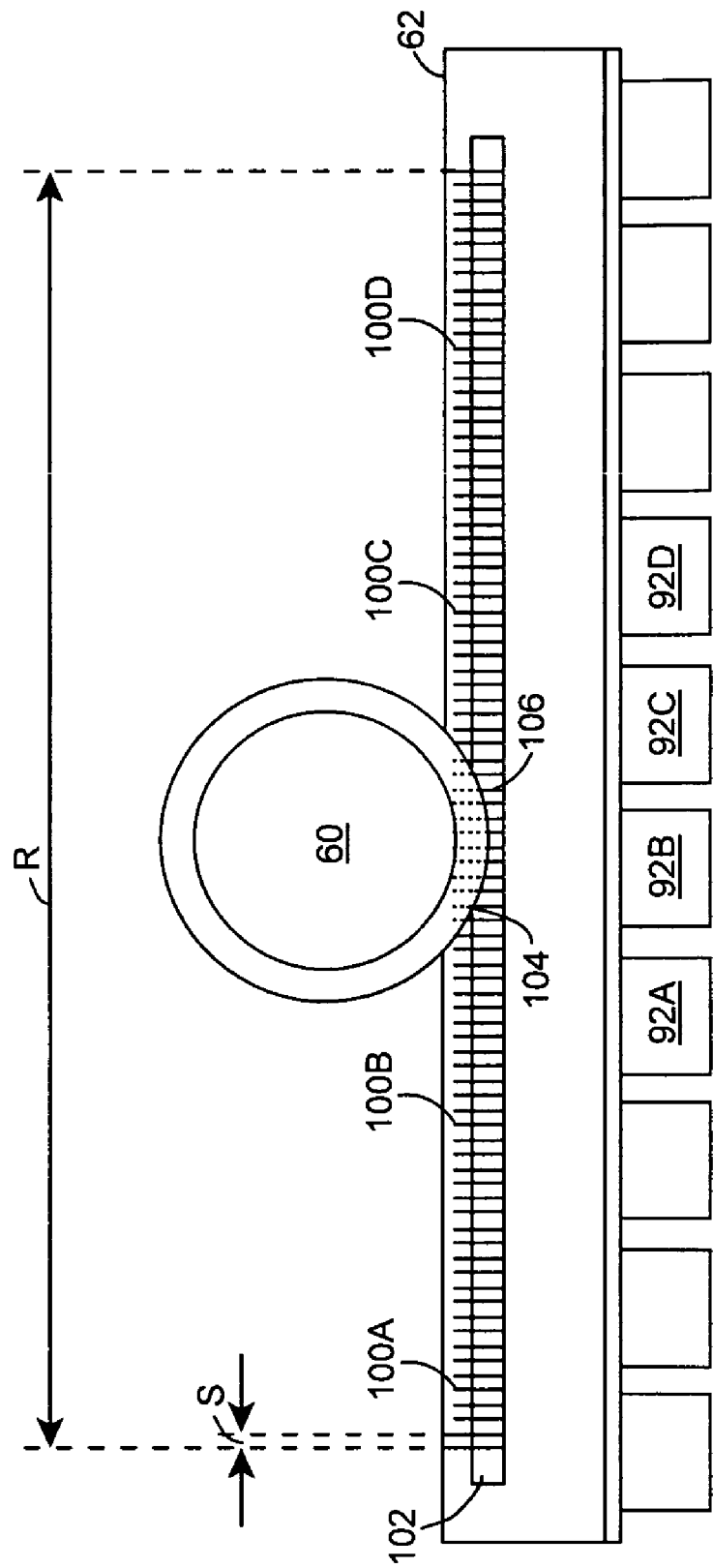

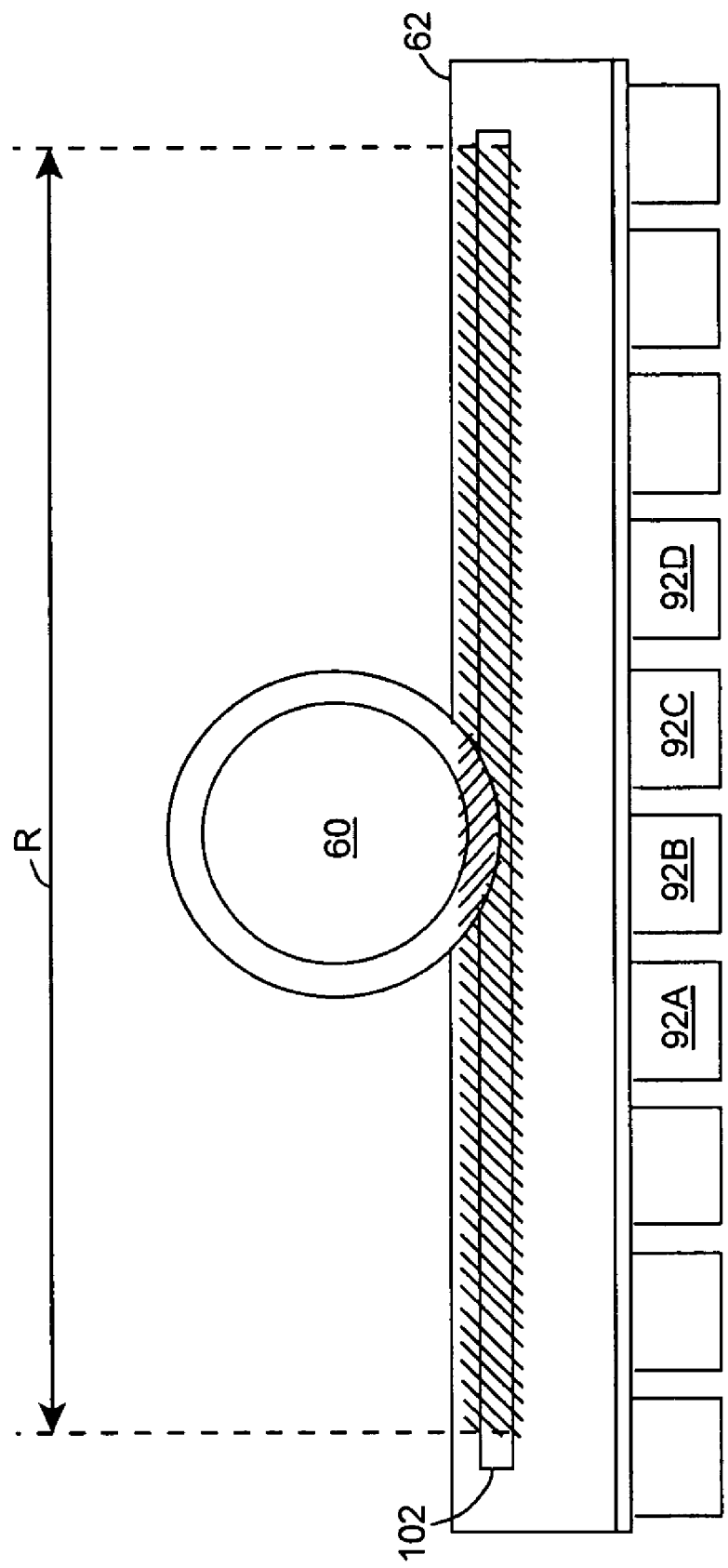

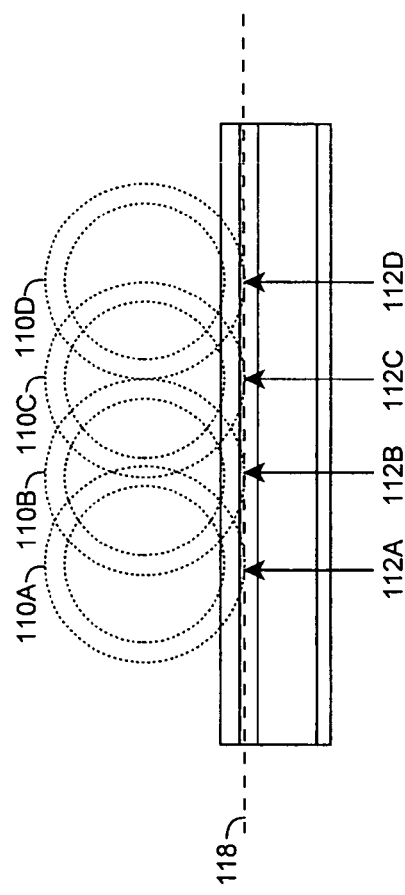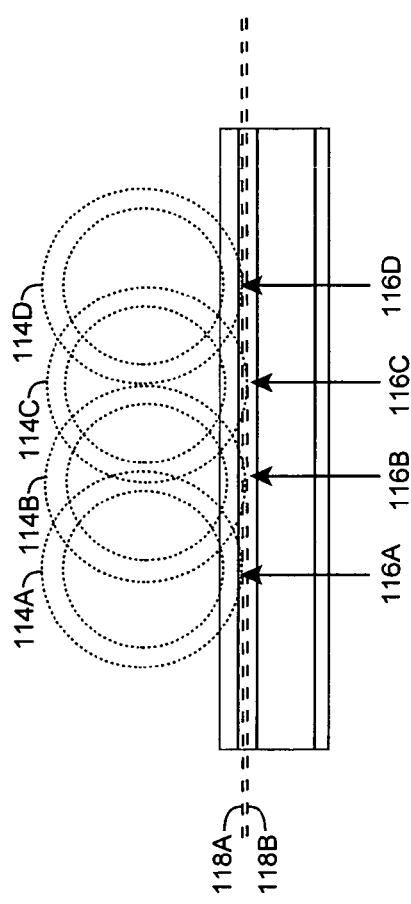

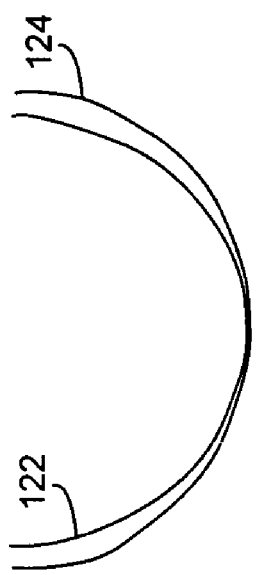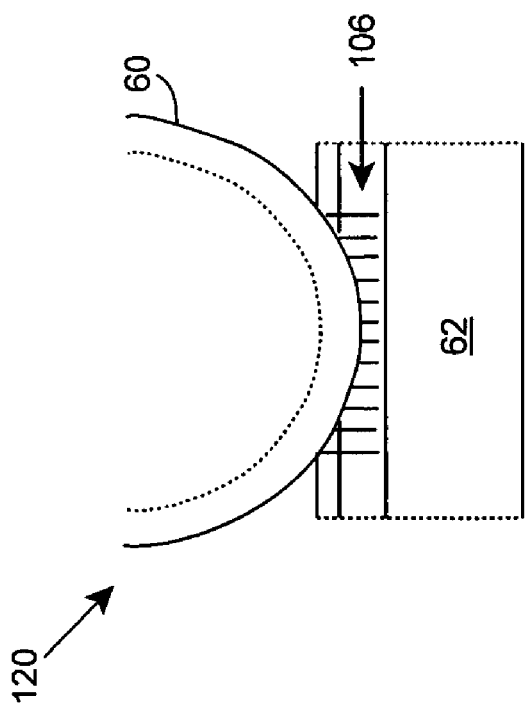

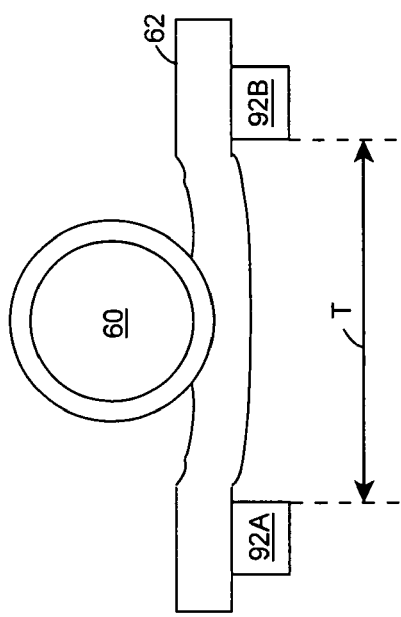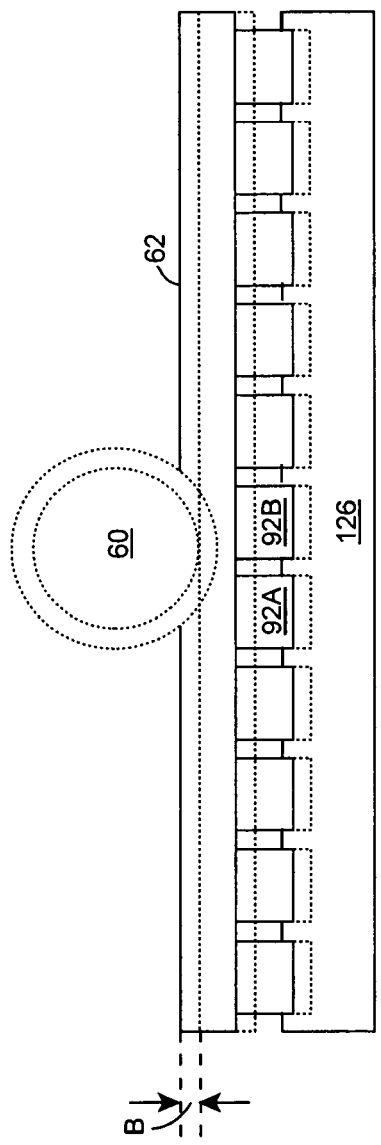

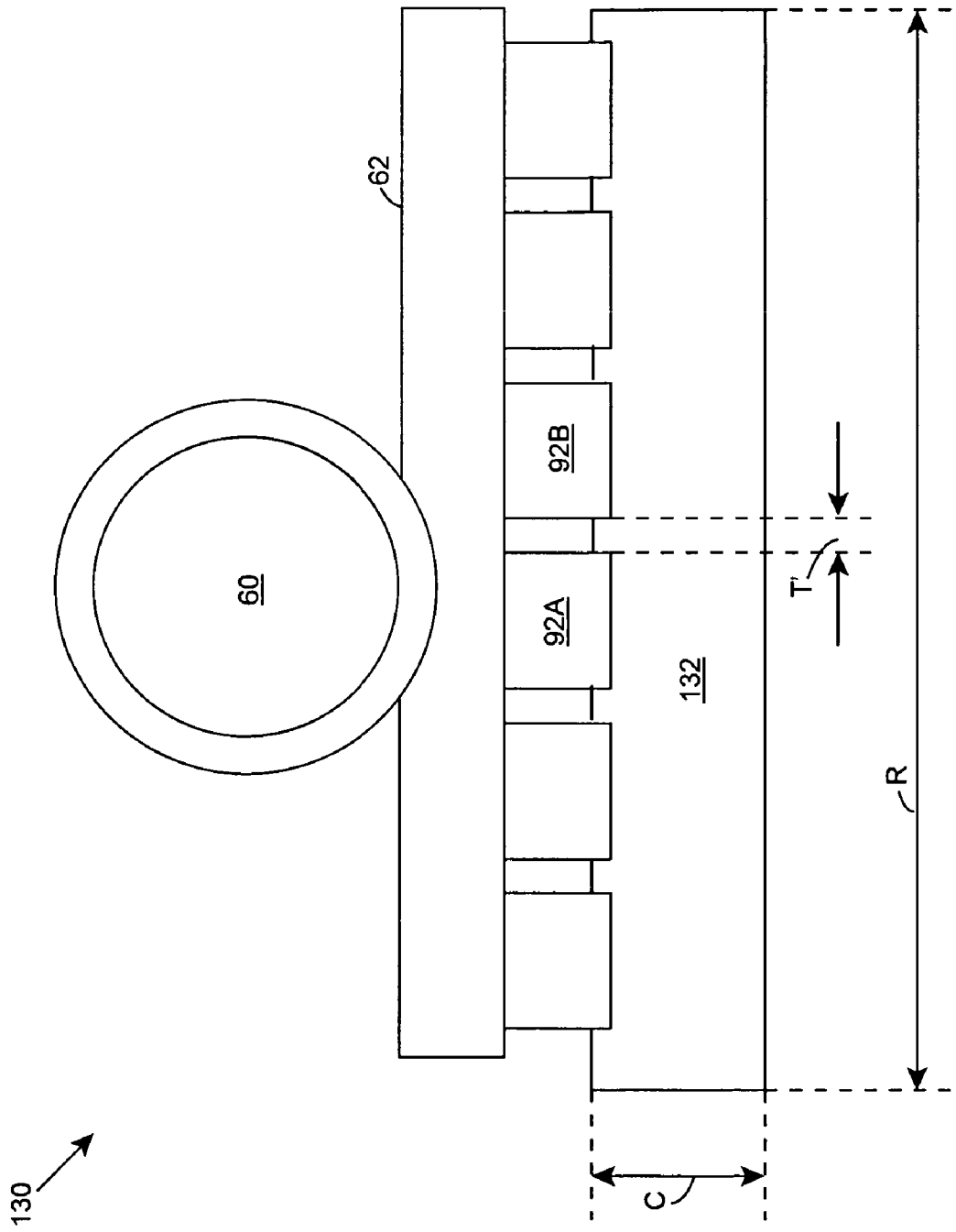

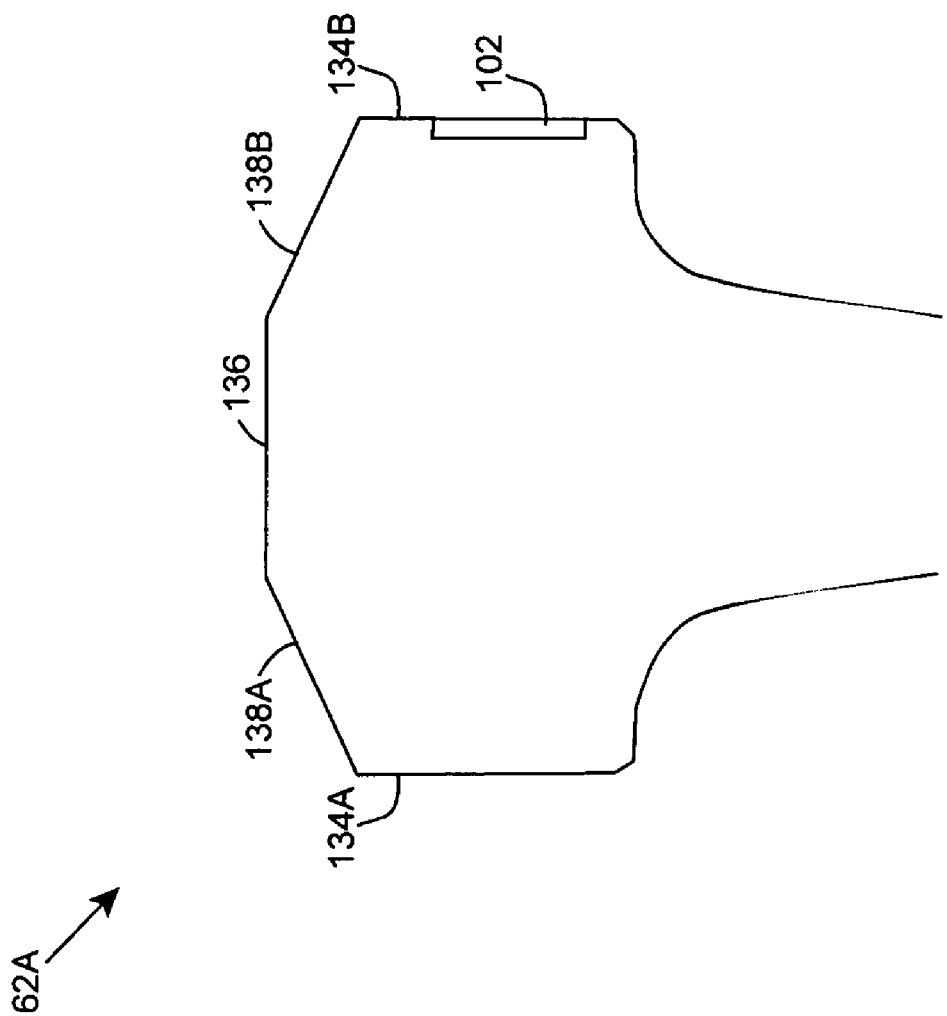

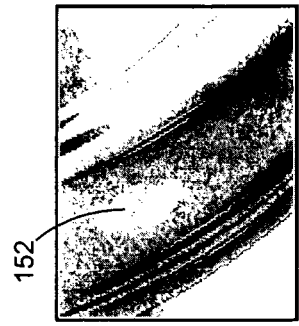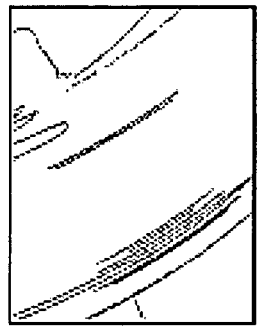

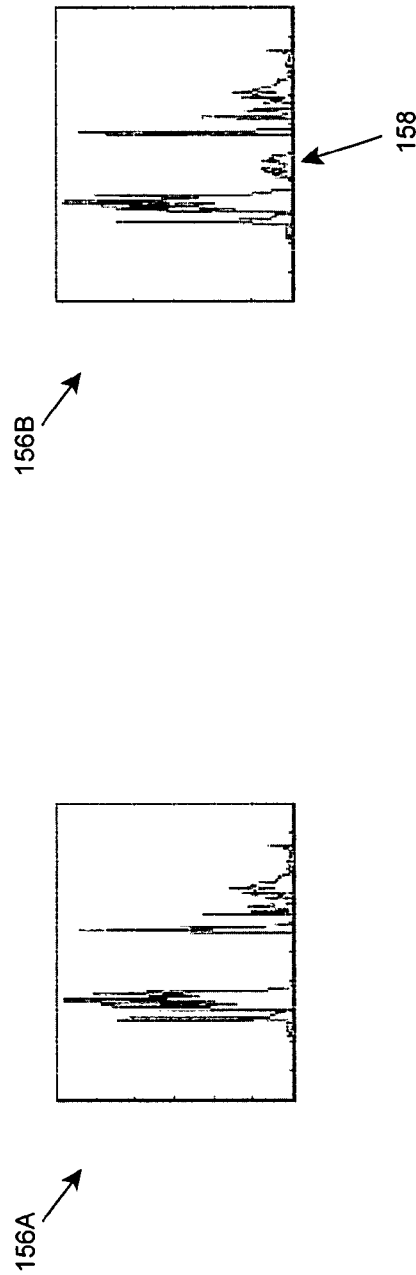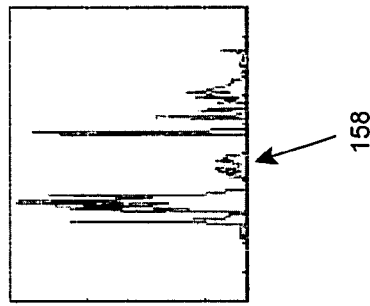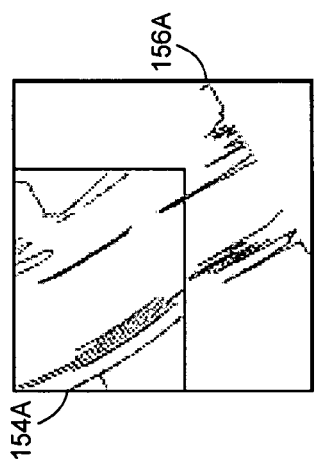

OPTICAL WHEEL EVALUATION

REFERENCE TO RELATED APPLICATION

The current application claims the benefit of U.S. Provisional Application No. 60/717,263, filed on Sep. 16, 2005, which is hereby incorporated herein by reference.

BACKGROUND OF THE INVENTION

1. Technical Field

The invention relates generally to the evaluation of a wheel, and more specifically, to a solution for optically measuring the wheel.

2. Background Art

Current wheel measurement solutions, such as those described in U.S. Pat. No. 5,636,026 entitled "Method and System for Contactless Measurement of Railroad Wheel Characteristics" and U.S. Pat. No. 6,768,551 entitled "Contactless Wheel Measurement System and Method", both of which are hereby incorporated herein by reference, effectively measure various attributes of a wheel. For example, when measuring a rail wheel, attributes such as the rim thickness, the flange thickness, the flange height, the reference groove diameter (when available), the wheel diameter and the wheel angle of attack, can be measured to ensure that continued operation of the wheel remains safe.

However, to date, these solutions do not provide an effective solution for measuring other wheel attributes, such as a profile of the tread surface, that may be used to determine other defects that may impact the operable status of the wheel. For example, a wheel may not be desirable for continued operation if it: includes a flat spot; is sufficiently out-of-round (e.g., elliptical shape); includes one or more gouges, cracks, and/or shelled areas; and/or the like. To this extent, a need exists for an improved optical evaluation solution that can accurately measure one or more of these wheel attributes.

SUMMARY OF THE INVENTION

The invention provides a solution for optically evaluating a wheel along at least one circumference of the wheel. Image data is obtained while the wheel moves along a path having a length of at least one circumference of the wheel. The path and/or wheel can be illuminated to enhance the resulting image data. One or more attributes of the wheel are measured based on the image data. The attributes can then be used to detect one or more defects in the wheel. In one embodiment, the wheel is a rail wheel, and a rail segment is illuminated. The rail can be specially configured to enhance a contrast between the rail and the rail wheel and/or to provide a consistent path for the rail wheel to travel.

A first aspect of the invention provides a method of evaluating a wheel, the method comprising: illuminating a path of the wheel, wherein a length of the path includes at least one circumference of the wheel; obtaining image data for the wheel as it moves along the path; and measuring at least one attribute of the wheel based on the image data.

A second aspect of the invention provides a system for evaluating a wheel, the system comprising: means for illuminating a path of the wheel, wherein a length of the path includes at least one circumference of the wheel; means for obtaining image data for the wheel as it moves along the path; and means for measuring at least one attribute of the wheel based on the image data.

A third aspect of the invention provides a method of evaluating a rail wheel, the method comprising: illuminating a rail segment, wherein a length of the rail segment includes at least one circumference of the wheel; obtaining image data for the rail wheel as it moves along the rail segment; and measuring at least one attribute of the rail wheel based on the image data.

A fourth aspect of the invention provides a system for evaluating a rail wheel, the system comprising: means for illuminating a rail segment, wherein a length of the rail segment includes at least one circumference of the wheel; means for obtaining image data for the rail wheel as it moves along the rail segment; and means for measuring at least one attribute of the rail wheel based on the image data.

A fifth aspect of the invention provides a business method for evaluating a wheel, the business method comprising managing a computer infrastructure that performs one or more of the steps described herein; and receiving payment based on the managing step.

A sixth aspect of the invention provides a method of generating a system for evaluating a wheel, the method comprising: obtaining a computer infrastructure; and deploying means for performing one or more of the steps described herein to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIG. 2 shows a partial cross-section view of an illustrative rail wheel.

FIG. 6 shows an illustrative illumination configuration for obtaining image data for a rail wheel and a rail according to an embodiment of the invention.

FIG. 7 shows an alternative illumination configuration for obtaining image data for a rail wheel and a rail according to an embodiment of the invention.

FIGS. 11A-B show various illustrative locations at which a rail wheel may be imaged.

FIGS. 13A-B show one solution for determining a size/severity of the out-of-round defect.

FIGS. 14A-B show a rail and ties when supporting a rail wheel of a standard load during normal operation.

FIG. 15 shows an illustrative measurement platform according to an embodiment of the invention.

FIG. 16 shows a cross-sectional profile of a custom rail segment according to an embodiment of the invention.

FIGS. 18A-B show illustrative images of a wheel tread surface with and without a flat spot, respectively.

FIGS. 19A-B show the resulting images after applying the Sobel edge/line detection to the images of FIGS. 18A-B, respectively.

FIGS. 20A-B show illustrative graphs that result from performing the Radon transform on each image of FIGS. 19A-B, respectively.

FIG. 21 illustrates the relationship between edges in the image of FIG. 19A and the corresponding radon transform of FIG. 20A.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for optically evaluating a wheel along at least one circumference of the wheel. Image data is obtained while the wheel moves along a path having a length of at least one circumference of the wheel. The path and/or wheel can be illuminated to enhance the resulting image data. One or more attributes of the wheel are measured based on the image data. The attributes can then be used to detect one or more defects in the wheel. In one embodiment, the wheel is a rail wheel, and a rail segment is illuminated. The rail can be specially configured to enhance a contrast between the rail and the rail wheel and/or to provide a consistent path for the rail wheel to travel.

Figure 1:
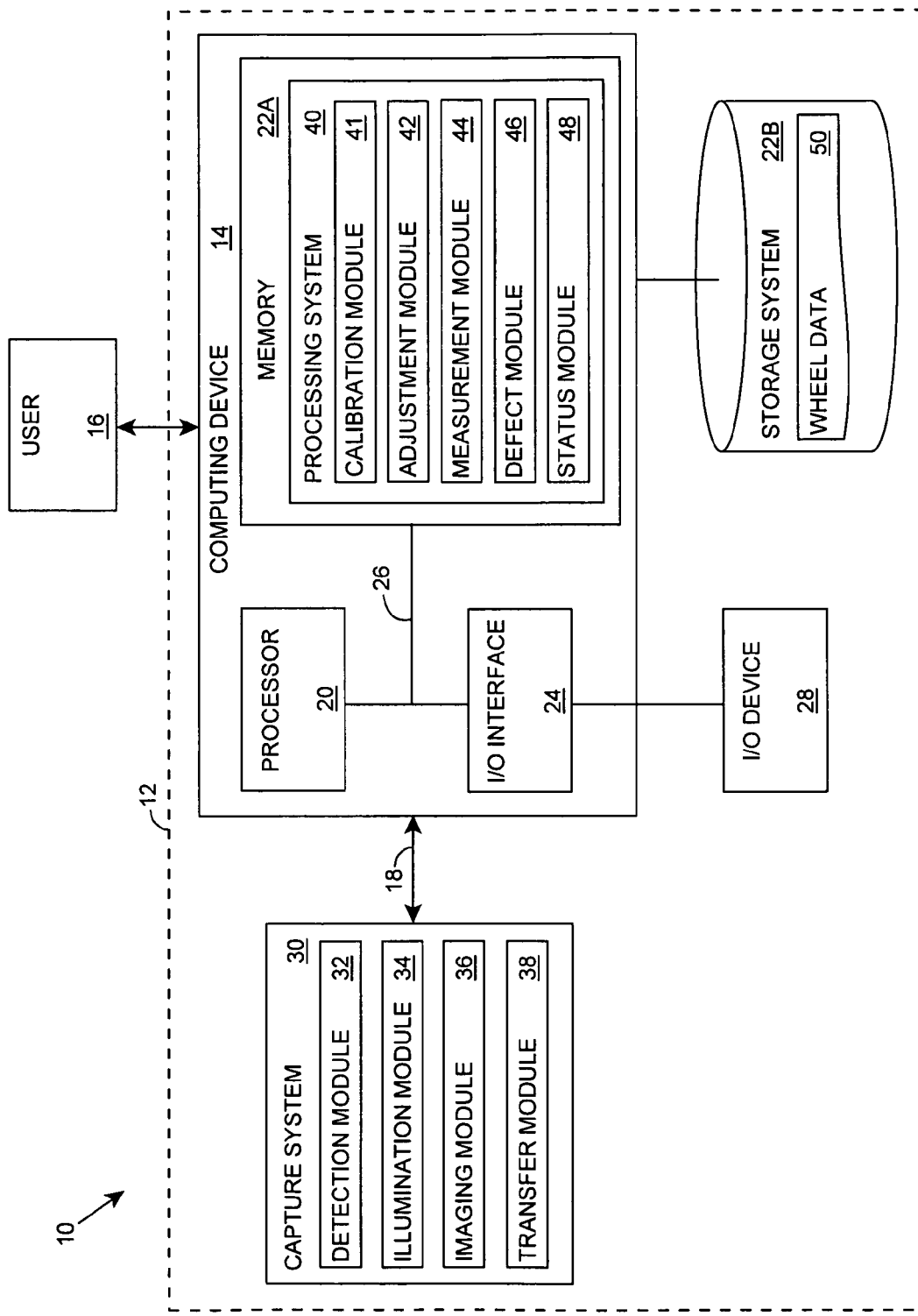
FIG. 1 shows a schematic view of an illustrative environment for evaluating a wheel according to an embodiment of the invention.

Turning to the drawings, FIG. 1 shows a schematic view of an illustrative environment 10 for evaluating a wheel according to an embodiment of the invention. To this extent, environment 10 includes a computer infrastructure 12 that can perform the various process steps described herein for optically evaluating the wheel. In particular, computer infrastructure 12 is shown including a capture system 30 for capturing wheel data 50 based on the wheel and a computing device 14 that comprises a processing system 40, which enables computing device 14 to measure the wheel by performing the process steps of the invention.

In general, capture system 30 is shown including a detection module 32, an illumination module 34, an imaging module 36, and a transfer module 38, each of which includes one or more devices for performing a corresponding function. For example, detection module 32 can include one or more devices for detecting the presence of a wheel and/or one or more attributes of the wheel, such as a speed, a brightness, a load, etc. Illumination module 34 can comprise one or more devices, such as a laser line generator, for illuminating a path of the wheel and/or a portion of the wheel. Imaging module 36 can include one or more devices, such as a camera, for sensing a reflection of the wheel and generating image data based on the sensed reflection. Transfer module 38 can comprise one or more devices for transferring the image data and/or other data on the wheel to computing device 14 for storage as wheel data 50 and/or processing by processing system 40.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as processing system 40, that is stored in memory 22A and/or storage system 22B. While executing computer program code, processor 20 can read and/or write data, such as wheel data 50, to/from memory 22A, storage system 22B, and/or I/O interface 24. Bus 26 provides a communications link between each of the components in computing device 14. I/O device 28 can comprise any device that enables a user 16 to interact with computing device 14 or any device that enables computing device 14 to communicate with one or more other computing devices, such as transfer module 38.

In any event, computing device 14 can comprise any general purpose computing article of manufacture capable of executing computer program code installed thereon (e.g., a personal computer, server, handheld device, etc.). Further, computing device 14 can comprise a specially designed ruggedized device, an embedded digital signal processing device, and/or the like. However, it is understood that computing device 14 and processing system 40 are only representative of various possible equivalent computing devices that may perform the various process steps of the invention. To this extent, in other embodiments, computing device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Capture system 30 communicates with computing device 14 over a communications link 18. Communications link 18 can comprise any combination of various types of wired and/or wireless communications link. To this extent, communications link 18 can comprise any combination of one or more types of networks (e.g., the Internet, a wide area network, a local area network, a virtual private network, etc.). In one embodiment, capture system 30 communicates with computing device 14 using a one-to-one wired connection, such as a universal serial bus (USB), a FireWire, or the like. Regardless, communications between the capture system 30 and computing device 14 may utilize any combination of various types of transmission techniques.

As previously mentioned and discussed further herein, processing system 40 enables computing infrastructure 12 to evaluate the wheel based on the image data received from capture system 30. To this extent, processing system 40 is shown including a calibration module 41 for calibrating capture system 30, an adjustment module 42 for adjusting one or more attributes of the image data and a measurement module 44 for calculating one or more measurements of the wheel. Further, processing system 40 is shown including a defect module 46 that determines whether one or more defects are present in the wheel and a status module 48 that determines whether the wheel is safe for continued use. Operation of capture system 30 and processing system 40 and each of their corresponding modules is discussed further herein. However, it is understood that some of the various modules shown in FIG. 1 can be implemented independently, combined, and/or stored in memory for one or more separate computing devices that are included in computer infrastructure 12. Further, it is understood that some of the modules and/or functionality may not be implemented, or additional modules and/or functionality may be included as part of environment 10.

Regardless, the invention provides a solution for optically evaluating a wheel. It is understood that while the invention is shown and described as performing an optical evaluation using image data generated based on visible light, the invention can use image data generated based on electromagnetic radiation comprising wavelengths in one or more of any portion of the electromagnetic spectrum. To this extent, alternative embodiments of the invention can generate image data based on a reflection of a wheel illuminated using electromagnetic radiation in one or more of the visible, infrared, near infrared, ultra-violet, X-ray, etc., portion(s) of the electromagnetic spectrum. Further, image data can be generated based on other non-electromagnetic radiation-based illumination solutions, such as an acoustic signal, a sonar signal, a magnetic field disturbance, and/or the like. Still further, only ambient lighting can be used to image the wheel. In this case, illumination module 34 may not be included as part of environment 10.

In one embodiment, environment 10 is used to measure various properties of a rail wheel. For example, FIG. 2 shows a partial cross-section view of an illustrative rail wheel 60. In general, rail wheel 60 can be utilized on a locomotive, a railroad car, and/or any other vehicle that rides on one or more rails 62. It is understood that rail wheel 60 is only illustrative of various types of rail and non-rail wheels. Various attributes/properties of rail wheel 60 can be measured. For example, attributes of rail wheel 60 such as a diameter/radius, a flange height, a reference groove circle radius, a rim thickness and/or the like, can be measured. Similarly, any desired attributes of a non-rail wheel can be measured using the invention. To this extent, the invention is not limited to measuring one or more attributes of any type for a particular rail/non-rail wheel 60.

In any event, rail wheel 60 is shown supported by a rail 62 and includes a field side 64 and a gauge side 66. Typically, field side 64 faces outward from a pair of rails 62 while gauge side 66 faces inward from a pair of rails 62. Adjacent to rail 62, rail wheel 60 includes a field side rim face 68, a tread surface 70, a flange 72, and a gauge side rim face 74. During normal operation, rail wheel 60 contacts rail 62 along tread surface 70 and rotates about a centerline 76, while flange 72 prevents wheel from leaving rail 62 due to outward forces present during normal operation. As a result, interaction between rail wheel 60 and rail 62 results in wear to tread surface 70 and flange 72.

Figure 3C:
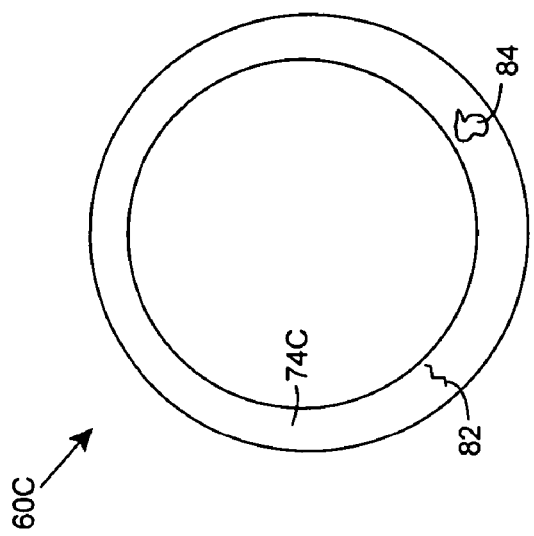
FIG. 3A-C show various illustrative defects of a rail wheel.
Figure 3B:
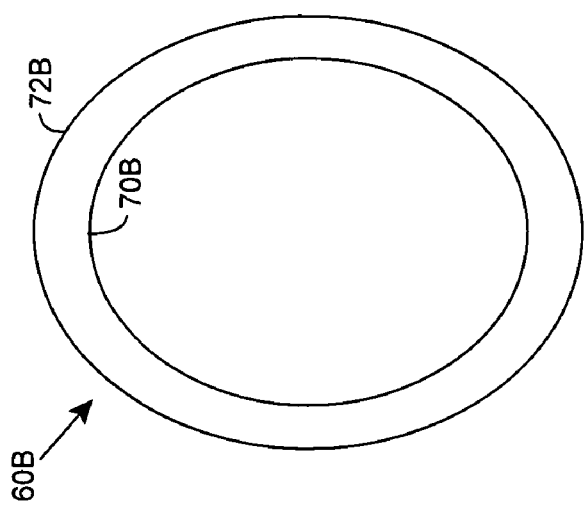
Figure 3A:
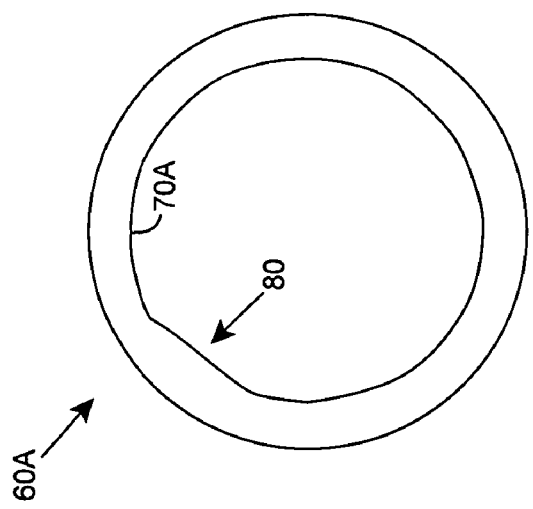

Uneven interaction between rail wheel 60 and rail 62 can create one or more defects in rail wheel 60. For example, FIG. 3A shows an illustrative rail wheel 60A in which tread surface 70A includes a flat spot 80. Flat spot 80 can be caused, for example, by sustained locking of a brake system. Further, FIG. 3B shows an illustrative rail wheel 60B comprising an out-of-roundness (OOR) defect due to an elliptical (e.g., oval) shape of tread surface 70B and/or flange 72B, which can be caused by uneven interaction due to improper installation of wheel 60B and/or improper location of a central hole of rail wheel 60B (e.g., offset from true center). Still further, debris, heat, a manufacturing defect, and/or the like, can create flat spot 80, an out-of-round rail wheel 60B and/or one or more additional defects, such as a crack (e.g., thermal crack), a gouge, a shelled area, etc. To this extent, FIG. 3C shows an illustrative rail wheel 60C, in which a gauge side rim face 74C comprises a narrow gouge 82 and a wider defect, such as a thermal crack 84. It is understood that the various defects shown in FIGS. 3A-C are only illustrative of the various possible defects of a rail wheel 60A-C that can be detected using the invention. Further, it is understood that the various defects are shown in an exaggerated manner for clarity. In practice, the invention can be used to detect much smaller, but identical in principle, defects of a rail wheel 60A-C.

Figure 4:
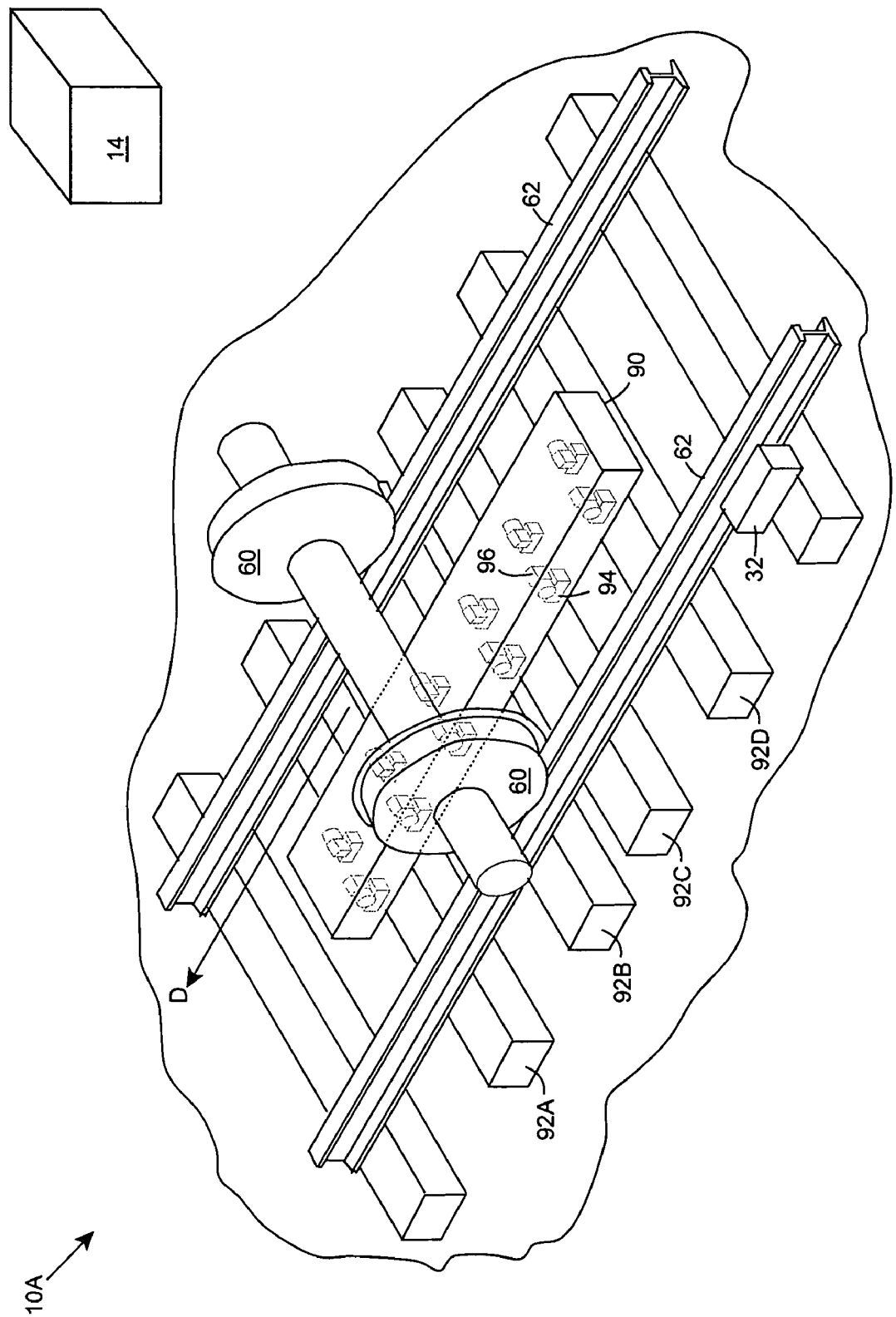
FIG. 4 shows a perspective view of an illustrative environment for evaluating rail wheels according to an embodiment of the invention.

FIG. 4 shows a perspective view of an illustrative environment 10A for measuring rail wheels 60 according to an embodiment of the invention. In general, rail wheels 60 are moving in direction D while being supported by rails 62. A detection module 32 is located in such a manner as to detect the presence of rail wheels 60 that are approaching enclosure 90. Enclosure 90 can comprise any type of ruggedized weatherproof enclosure and can be secured to ties 92A-D using any solution. In general, illumination module 34 (FIG. 1) includes one or more illumination devices, while imaging module 36 (FIG. 1) includes one or more imaging devices. To this extent, enclosure 90 is shown including a plurality of illumination device/imaging device pairs, such as illumination device 94 and imaging device 96, which can be attached to enclosure 90 using any solution. In operation, detection module 32 senses a presence of rail wheel(s) 60 and signals illumination devices 94 and imaging devices 96. In response, each illumination device 94/imaging device 96 operates to obtain image data of rail wheel 60 and rail 62.

Detect module 32 can further sense a speed at which rail wheel 60 is traveling. In this case, the operation of illumination devices 94 and/or imaging devices 96 can be adjusted based on the speed. For example, environment 10A can be configured to process rail wheels 60 moving at speeds of up to approximately twenty miles per hour. Based on the actual speed of rail wheel 60, an amount of time that illumination devices 94 illuminate rail 62 can be adjusted and/or a number of images per second that are captured by imaging devices 96 can be adjusted to obtain the desired resolution, thereby conserving system resources (e.g., memory) for slower moving rail wheels 60. Further, when rail wheel 60 is detected as moving faster than a maximum speed, illumination devices 94 and/or imaging devices 96 can remain idle while rail wheel 60 passes. In this case, an error code or the like can be generated by detection module 32. Additionally, detection module 32 can sense a brightness of rail wheel 60 and the operation of illumination devices 94 and/or imaging devices 96 can be adjusted based on the brightness in a known manner.

It is understood that various solutions can be implemented to reduce an amount of time that each illumination device 94 and/or imaging device 96 operates while imaging rail wheel 60. In one embodiment, detection module 32 signals a first illumination device 94 and/or imaging device 96 over which rail wheel 60 will pass. In response, the first imaging device 96 can be activated and begin imaging rail wheel 60. Using the image data, imaging module 36 (FIG. 1) can determine when rail wheel 60 has reached a particular point in the field of view of the first imaging device 96 (e.g., seventy percent across). Once this point is reached, imaging module 36 can activate the next illumination device 94 and/or imaging device 96, which begins imaging rail wheel 60. Subsequently, the previous imaging device 96 can be turned off when imaging module 36 determines that rail wheel 60 has left its field of view and/or when imaging module 36 determines that rail wheel 60 has reached a particular point in the field of view of the next imaging device 96. In either case, only two imaging devices 96 will be operating at any one time, thereby reducing the demand at any one time on the system.

Figure 5:
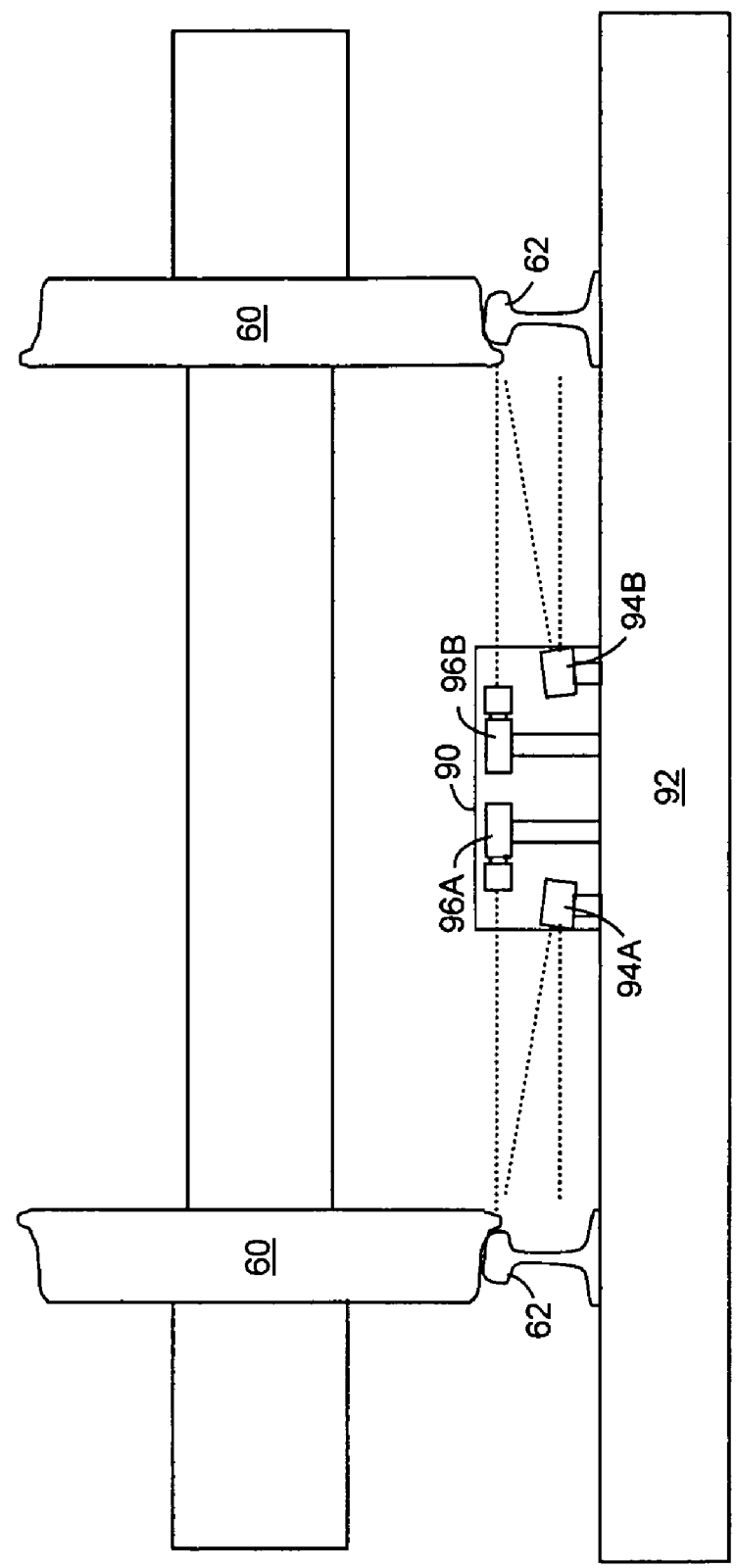
FIG. 5 shows a side view of a portion of the illustrative environment of FIG. 4.

FIG. 5 shows a side view of a portion of environment 10A to illustrate the operation of illumination devices 94A-B and imaging devices 96A-B. As shown in FIG. 5, each illumination device 94A-B projects electromagnetic radiation, such as one or more laser lines, onto rail 62 and the gauge side 66 (FIG. 2) of rail wheel 60 as it moves along rail 62. While rail wheel 60 is within a corresponding field of view, each imaging device 96A-B captures image data, such as one or more images, of rail wheel 60 and rail 62 based on a reflection of the electromagnetic radiation. Subsequently, the image data is communicated to computing device 14 (FIG. 1) for processing by processing system 40 (FIG. 1).

Returning to FIG. 4, it is understood that environment 10A is only illustrative of various possible alternative environments. For example, while only a single detection module 32 is shown, a second detection module could be located on another side of enclosure 90 to sense rail wheels 60 approaching from the opposite direction. In any event, it is understood that detection module 32 must be located a sufficient distance from enclosure 90 to provide enough time to prepare illumination device(s) 94 and/or imaging device(s) 96. Such a distance will vary based on a desired maximum speed at which rail wheels 60 can travel.

Additionally, while multiple illumination device 94/imaging device 96 pairs are shown, it is understood that any number (e.g., one or more) of illumination devices 94 and/or imaging devices 96, paired or unpaired, could be used. For example, a single illumination device 94 may be provided, which directs the radiation at rail wheel 60 as it passes along rail 62. Such tracking can be performed using any mechanism, such as a mirror, a pan-tilt mounting, and/or the like, combined with a control system that provides an estimated speed of rail wheel 60 across the field of view. Similarly, a single wide-angle imaging device 96, such as that described in the co-owned, co-pending U.S. patent application Ser. No. 11/205,242, entitled "Multi-Directional Viewing and Imaging", which was filed on Aug. 16, 2005 and is hereby incorporated herein by reference, could be used for each rail 62 and/or both rails 62. In either case, illumination and/or imaging of rail wheel 60 can be performed using a single illumination and/or imaging device. Such a configuration may simplify various aspects of the solution and/or reduce the overall cost, particularly when illumination devices 94 and/or imaging device 96 are costly. Further, rail wheels 60 on only a single rail 62 could be imaged and/or rail wheel(s) 60 could be imaged from both the field side 64 (FIG. 2) and gauge side 66 (FIG. 2).

In an embodiment, rail wheel 60 is imaged by imaging device(s) 96 over a distance that comprises at least one full revolution of rail wheel 60. To this extent, illumination device(s) 94 and/or imaging device(s) 96 can be configured to illuminate and/or image an area that is at least the circumference of the largest wheel to be imaged. The actual area that is illuminated and/or imaged can remain constant (in which case a smaller rail wheel 60 is imaged for more than one revolution) or adjusted based on an actual size of rail wheel 60. Regardless, it is understood that multiple wheels, such as rail wheel 60, may require imaging simultaneously, e.g., two adjacent rail wheels 60 may be separated by a distance that is less than the circumference of each wheel. To this extent, illumination device(s) 94 and/or imaging device(s) 96 can be capable of illuminating and/or imaging multiple wheels simultaneously.

FIG. 6 shows an illustrative illumination configuration for obtaining image data for rail wheel 60 and rail 62 according to an embodiment of the invention. In particular, referring to FIGS. 4 and 6, one or more illumination devices 94 generate a plurality of substantially vertical lines of light, such as lines of light 100A-D along a path of rail wheel 60. Illumination device(s) 94 project the lines of light 100A-D onto a segment of rail 62 in a location that will be intersected by flange 72 (FIG. 2) of rail wheel 60 as it moves along rail 62. Lines of light 100A-D are projected onto rail 62 over a total distance, R, that is greater than or equal to one full revolution of rail wheel 60, i.e., at least one circumference of rail wheel 60. Further, lines of light 100A-D can be separated by a distance, S, that provides a desired resolution. For example, lines of light 100A-D can be spaced by approximately one-fourth of an inch or less to provide a resolution for identifying defects that is typically desired in the rail industry. It is understood that a higher or lower resolution can be obtained by using narrower or wider spacing S, respectively. Additionally, using nonlinear analysis, similar accuracy may be possible when using wider spacing S, such as up to three inches between lines of light 100A-D.

For each line of light 100A-D intersected by rail wheel 60, the corresponding image data for the line of light 100A-D will be different for that portion reflected off of rail wheel 60 and that portion reflected off of rail 62. To enhance the contrast, illumination module 34 (FIG. 1) can further include reflective material 102. Reflective material 102 can comprise any type of light-diffusing material that is permanently or temporarily applied to rail 62 and/or is embedded in rail 62 during manufacturing. As shown, reflective material 102, when included, can extend along rail 62 for at least distance R. Further, reflective material 102 should be placed in such a manner that flange 72 (FIG. 2) of rail wheel 60 partially covers reflective material 102 as it moves along rail 62. In this manner, reflective material 102 assists in determining the point at which each reflected line of light 100A-D is intersected by rail wheel 60. It is understood that alternative solutions for enhancing the contrast can be employed in addition to and/or alternative to the inclusion of reflective material 102. For example, rail 62 can be cleaned, painted a particular color, a reflective solution can be applied, a random pattern can be applied to the surface of rail 62, and the like.

It is understood that substantially vertical lines of light 100A-D and/or reflective material 102 are only one laser-based solution for illuminating rail wheel 60 and/or rail 62. For example, one or more lasers or laser splitters can generate lines of light that are substantially horizontal with a known separation, multiple cross hair patterns, or of any desired orientation. In an embodiment, electromagnetic radiation is projected onto rail wheel 60 in a pattern, such as a moire pattern. In this case, one or more deformations of the pattern can be used to identify a state of stress and/or other flaws in rail wheel 60. Further, another solution can utilize a series of laser micrometers through rail 62 to detect variations in height. Still further, a single laser source and a series of reflective surfaces on and/or off rail 62 could fold a light path of a single sheet of light laser into a laser curtain. In this case, a line-scan camera or other imaging device 96 (FIG. 4) could track a minimum height of the image.

Further, the invention can incorporate non-laser based illumination. For example, one or more bright Xenon and/or halogen lamps can illuminate rail wheel 60 and rail 62 in a strobed or continuous manner. To this extent, FIG. 7 shows an alternative illumination configuration for obtaining image data for rail wheel 60 and rail 62 according to an embodiment of the invention. In this case, the illumination is diffuse and substantially constant along distance R and the edge of rail wheel 60 can be identified based on a difference between the light reflected off of rail 62 versus the light reflected off of rail wheel 60. As shown, a reflective surface 102 can also be used to enhance the difference. In analyzing image data obtained based on this illumination, a series of points can be extracted and used to generate a curve that approximates the edge of rail wheel 60.

In still other alternative embodiments, illumination module 34 (FIG. 1) only illuminates rail wheel 60 or rail 62. For example, one or more illumination devices 94 (FIG. 4), laser or diffuse, could illuminate rail wheel 60 from below to create a bright outline of rail wheel 60 and/or a series of bright points along the edge of rail wheel 60 that are subsequently imaged using one or more imaging devices 96 (FIG. 4). Further, illumination module 34 could comprise one or more passive solutions for illuminating rail wheel 60 or rail 62. For example, illumination module 34 can comprise fluorescent and/or self-illuminating material that is embedded in/applied to rail 62, and which may be implemented without the use of any illumination devices 94.

Returning to FIG. 4, each imaging device 96 can comprise any combination of known imaging electronics, optics (e.g., one or more lenses) and a camera mount. The optics can comprise any configuration appropriate for the particular environment 10A. In any event, each imaging device 96 can comprise a standard digital camera connected to computing device 14 and/or transfer module 38 (FIG. 1) using a Universal Serial Bus (USB), a FireWire, or the like. Alternatively, imaging device(s) 96 can comprise a line-scan camera, an analog camera, and/or another type of camera that includes sufficient resolution. In one embodiment, rail wheel 60 can move at a speed of up to approximately twenty miles per hour. To this extent, imaging device 96 should be capable of obtaining at least thirty images per second in order to obtain sufficient images of rail wheel 60. Additionally, it is understood that each imaging device 96 includes other functional requirements for machine vision applications, such as exposure control, progressive scan, anti-blooming, and the like.

The imaging electronics can comprise support electronics and image sensors such as CCD chips, which are usually square or broadly rectangular in their sensing area. However, as can be seen in FIG. 6, the area of interest in the image data, e.g., that area of rail wheel 60 that intersects lines of light 100A-D, is longer horizontally than vertically. To this extent, the optics can be designed to emphasize the vertical dimension, which is critical for sensing the vertical variation of rail wheel 60, and compress the horizontal dimension to increase the amount of image data of interest that is captured by the imaging electronics. In this manner, fewer imaging devices 96 may be necessary to generate the required image data.

Figure 8A:
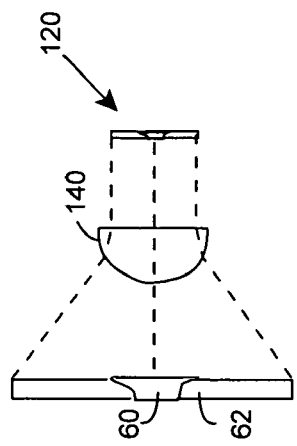
FIGS. 8A-B show side and top views, respectively, of an illustrative cylindrical lens according to an embodiment of the invention.
Figure 8B:
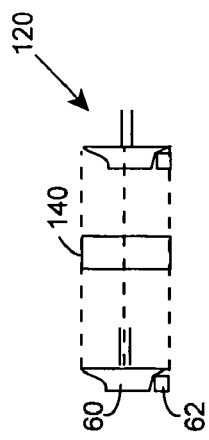
Figure 9:
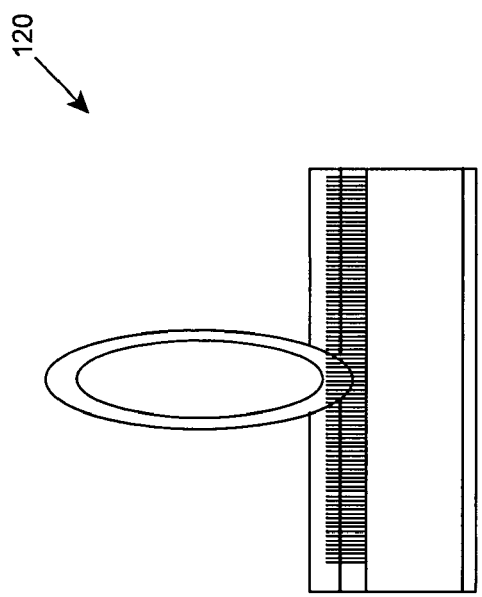
FIG. 9 shows an illustrative image generated using the cylindrical lens of FIGS. 8A-B.

In one embodiment, the optics comprise one or more cylindrical lenses. For example, FIGS. 8A-B show side and top views, respectively, of an illustrative cylindrical lens 140 according to an embodiment of the invention. In general, cylindrical lens 140 has a profile similar to a half cylinder. To this extent, in FIG. 8A, cylindrical lens 140 (shown exaggerated) has its axis of symmetry oriented vertically with cylindrical lens 140 facing rail wheel 60 to be imaged. In this case, electromagnetic radiation is not refracted, yielding an unchanged vertical dimension in image 120. By contrast, in FIG. 8B, the curved portion of cylindrical lens 140 refracts the electromagnetic radiation, which results in an effective shrinking of the apparent horizontal dimension in image 120. FIG. 9 shows an illustrative image 120 generated using the cylindrical lens 140 of FIGS. 8A-B, which emphasizes the vertical dimension and compresses the horizontal dimension.

Figure 10:
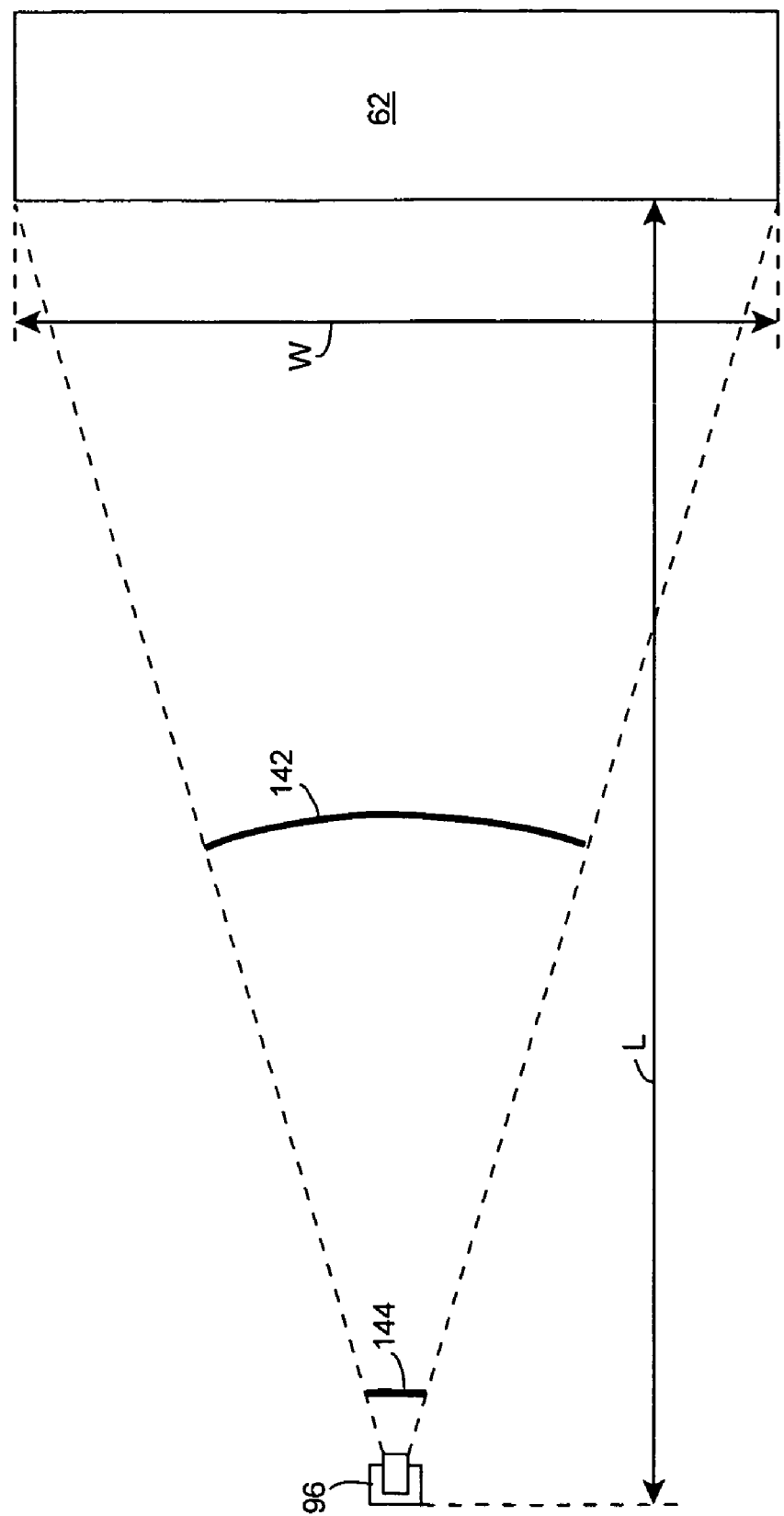
FIG. 10 shows an illustrative optical arrangement according to an embodiment of the invention.

It is understood that the optics may be more complex in order to focus image 120 fully onto the imaging electronics with minimal additional distortion. To this extent, the optics can include a positive cylindrical lens, a negative cylindrical lens, and/or a rotationally symmetric lens adjusted to produce the proper image at the required distance for an installed system. For example, FIG. 10 shows an illustrative optical arrangement according to an embodiment of the invention, in which an imaging device 96 images a portion of rail 62. In this case, a reflection off of rail 62 is directed by a fresnel cylindrical lens 142 and then a plano-convex cylindrical lens 144 before being imaged by image device 96. To this extent, in order to achieve a proper focus of the resulting image, imaging device 96 can be a distance L of approximately twenty-seven inches from rail 62 to image a distance W of rail 62 of approximately fifteen inches. It is understood that many other optical arrangements are possible for various types of imaging hardware as will be recognized by one in the art.

When only a limited portion of rail wheel 60 (FIG. 2) requires imaging, e.g., only the portion that drops below rail 62, then the optics can further limit the vertical dimension of the field of view for each imaging device 96. For example, a maximum variation caused by a defect, such as a flat spot, on rail wheel 60 can be determined based on the maximum size of the defect. In this case, the vertical dimension of the field of view can be reduced to correspond to the maximum vertical variation. As a result, an amount of data that requires processing for the vertical dimension is reduced. To this extent, a greater horizontal dimension could be used for the field of view, thereby reducing a total number of imaging devices 96 (FIG. 2) required.

Returning to FIG. 4, while each imaging device 96 can generate color and/or monochrome images based on visible light, it is understood that one or more imaging devices 96 can generate images based on electromagnetic radiation in the visible, near infrared, infrared, ultraviolet, X-rays, and/or other portions of the electromagnetic spectrum. Further, imaging device(s) 96 can generate image data can be generated based on other non-electromagnetic radiation-based illumination solutions, such as an acoustic signal, a sonar signal, a magnetic field disturbance, and/or the like.

To this extent, each illumination device 94 can illuminate rail wheel 60 and/or rail 62 using any combination of electromagnetic and/or non-electromagnetic radiation-based illumination solution(s), which can subsequently be used to obtain image data by a corresponding electromagnetic and/or non-electromagnetic radiation-based imaging device 96. The use of other types of non-visible illumination can enable imaging devices 96 to obtain image data that can be used to measure various attributes of rail wheel 60 that are not revealed by visible light. For example, the use of image data obtained based on infrared light can be used to detect a temperature difference between various surfaces, which can indicate over heating due to one or more defects (e.g., flat spot). Similarly, infrared, X-ray and/or non-electromagnetic radiation-based image data can be used to measure one or more internal attributes of rail wheel 60, which in turn may be used to determine one or more sub-surface defects of rail wheel 60 that are hidden from visible light.

Further, additional data on rail wheel 60 can be extracted from multi-spectral image data. In particular, one or more illumination devices 94 can illuminate rail wheel 60 with electromagnetic radiation in different portions of the electromagnetic spectrum and/or with electromagnetic radiation and non-electromagnetic radiation-based illumination, while one or more imaging devices 96 obtain image data for each illumination solution. Measurement module 44 (FIG. 1) can combine the image data using any known image fusion technique and analyze the resulting multi-spectral image data. For example, using a combination of visible light and infrared images, the detection of flat spots and other tread defects may be made more reliable, robust and/or accurate by identifying both a difference in height of rail wheel 60 and a temperature difference that may be present due to a defect. It is understood that this example is only illustrative of many potential multi-spectral applications as will be recognized by one in the art. To this extent, image data can be generated based on any combination of electromagnetic and/or non-electromagnetic radiation-based illumination solutions.

In any event, returning to FIG. 1, transfer module 38 transfers image data captured by imaging module 36 to computing device 14 for storage and/or processing by processing system 40. Further, transfer module 38 can transfer additional data on each wheel 60 (FIG. 2) to computing device 14. For example, transfer module 38 can include a timestamp for the image data, a number for wheel 60 in a sequence of wheels, a side of a pair of tracks 62 (FIG. 2) on which wheel 60 was located, an identifier for the particular imaging device 96 (FIG. 4), and the like. To this extent, transfer module 38 can comprise a computing device that is placed within or adjacent to enclosure 90 and is in communication with imaging devices 96. Alternatively, each illumination device 94 (FIG. 4) and/or imaging device 96 can communicate directly with and/or be controlled by computing device 14. In this case, transfer module 38 can be implemented as part of processing system 40. Regardless, processing system 40 can receive the image data and/or additional data and process and/or store it as wheel data 50.

After installation, calibration module 41 can calibrate capture system 30. To this extent, calibration module 41 can perform a series of calibration operations that can be performed with and/or without the assistance of user 16. For example, calibration module 41 can obtain a set (one or more) of baseline condition images of rail 62 (FIG. 4) when illuminated with no rail wheel 60 (FIG. 4) present. The set of baseline condition images can be used to assist in detecting rail wheel 60 and/or one or more defects in rail wheel 60 based on changes in the illumination (e.g., lines of light 100A-D of FIG. 6) in subsequent images. To this extent, calibration module 41 can account for any variation in the fields of view between imaging devices 96 (FIG. 4). For example, each imaging device 96 can comprise a field of view that is larger than that required, thereby overlapping the field of view of at least one other imaging device 96. During calibration, calibration module 41 can determine the location in an overlapping portion of each field of view that includes one or more rail 62 components. Since rail 62 is the same for two adjacent fields of view, calibration module 41 can determine any difference in the vertical pixel location of rail 62 between two adjacent imaging devices 96 due to differences in the alignment of each imaging device 96, and such differences can be accounted for when processing the image data.

Further, calibration module 41 can obtain image data for one or more "known good" rail wheels 60. This image data can be analyzed and processed as described herein to determine whether all modules/systems in environment 10 are functioning properly and yield the correct results. When one or more errors are detected, an adjustment to the corresponding module/system can be made and image data can be reacquired until all modules/systems generate the correct results. When operation of one or more modules/systems is adjusted based on one or more conditions, such as lighting, speed, and/or the like, calibration module 41 can obtain image data for rail wheels 60 for multiple variations of each condition to confirm/adjust the correct operation of all modules/systems in environment 10 in a known manner.

In operation, adjustment module 42 can perform one or more adjustments on the image data. For example, adjustment module 42 can perform pixel interpolation to enhance particular features in the image data, can remove unnecessary data from the image data, etc. To this extent, adjustment module 42 can perform pixel interpolation along the last few pixels of each line of light 100A-D (FIG. 6) to enhance an estimate of the edge of wheel 60 (FIG. 2) with fewer pixels.

Further, adjustment module 42 can enhance/manipulate contrast and/or brightness for the image data to compensate for low illumination, glare, surface conditions of wheel 60, and/or the like. To this extent, adjustment module 42 can implement any combination of known algorithms as desired for a particular application. Subsequently, adjustment module 42 can store the adjusted image data as wheel data 50.

In any event, measurement module 44 can extract various measurements from the image data, which are subsequently stored as wheel data 50. In one embodiment, measurement module 44 initially determines if rail wheel 60 (FIG. 2) is present in a particular image. For example, measurement module 44 can examine a particular region of the image for known features such as edges, variations in lines of light 100A-D (FIG. 6), and/or other features that indicate the presence of rail wheel 60 in the field of view. To this extent, measurement module 44 can determine a lowest point in an image in which a clear contrast is present. When no rail wheel 60 is present, this point will correspond to the lower edge of rail 62 (FIG. 2), which can be used as a baseline for detecting rail wheel 60. Regardless, if no rail wheel 60 is present, measurement module 44 can stop processing the image.

When rail wheel 60 (FIG. 2) is present, measurement module 44 can extract a minimum height for rail wheel 60 from each of a plurality of images of rail wheel 60. For example, FIGS. 11A-B show various illustrative locations at which rail wheel 60 may be imaged. In FIG. 11A, rail wheel images 110A-D are shown superimposed on one another. Using standard image processing techniques, for each rail wheel image 110A-D, measurement module 44 can extract a corresponding minimum height 112A-D from the image data. Similarly, in FIG. 11B, rail wheel images 114A-D are shown superimposed on one another, with their corresponding minimum heights 116A-D extracted. It is understood that while rail wheel images 110A-D, 114A-D are shown comprising a complete profile of rail wheel 60 for illustration, the actual image would comprise only a portion of the bottom of rail wheel 60. Further, it is understood that any solution for obtaining a minimum height for rail wheel 60 can be implemented. For example, measurement module 44 can use additional data from a sensing device (e.g., image, proximity, etc.) to determine a minimum height for rail wheel 60.

Additionally, measurement module 44 (FIG. 1) can extract other points from the image data and store these points as wheel data 50. For example, returning to FIG. 6, when the image data includes a plurality of substantially vertical lines of light 100A-D, measurement module 44 (FIG. 1) can extract a series of locations, such as location 104, at which each line of light 100A-D that rail wheel 60 intersects transitions from rail 62 to rail wheel 60. Further, measurement module 44 can extract a group of intersection height lines, such as intersection height line 106, based on the portion of each line of light 100A-D that intersects rail wheel 60 that is reflected off of rail 62. In this case, the group of intersection height lines 106 will approximate the profile of rail wheel 60. Further, when a vertical centerline 76 (FIG. 2) of rail wheel 60 aligns with one of the intersection height lines 106, measurement module 44 can determine a minimum height. In one embodiment, measurement module 44 only determines the minimum height when rail wheel 60 first enters the field of view of the first imaging device 96 (FIG. 4). Alternatively, measurement module 44 can obtain the minimum height from another system, such as one of those described in U.S. Pat. Nos. 5,636,026 and 6,768,551, both of which have been incorporated herein by reference. In any event, using the extracted measurements, measurement module 44 can measure various attributes of rail wheel 60 in a known manner. It is understood that image data, such as an image captured by a single imaging device 96 (FIG. 4), could include two or more rail wheels 60 therein. In this case, measurement module 44 can extract various measurements for each rail wheel 60, and store the measurements with the wheel data 50 (FIG. 1) for the corresponding wheel.

Returning to FIG. 1, defect module 46 can determine whether one or more defects are present in the wheel based on wheel data 50 and/or the measured attributes. For example, defect module 46 can construct a curve using time-delayed integration (TDI) or the like, that delineates the motion of an edge of rail wheel 60 (FIG. 2) as it moves across distance R (FIG. 6). To this extent, returning to FIG. 11A, defect module 46 can generate one or more lines 118 based on the group of minimum heights 112A-D. In general, when rail wheel 60 does not include a defect, such as a flat spot, a chipped flange 72 (FIG. 2), or the like, defect module 46 should be able to generate a single line 118 that includes all of the minimum heights 112A-D. In contrast, as shown in FIG. 11B, when rail wheel 60 (FIG. 2) includes, for example, a flat spot on tread surface 70 (FIG. 2), defect module 46 will require two or more lines 118A-B to include all of the minimum heights 116A-D. In particular, minimum heights 116A, 116D would belong to line 118A, while minimum heights 116B, 116C would belong to line 118B. In generating the line(s) 118A-B, it is understood that defect module 46 can use a margin of error before a minimum height is classified as belonging to a new line 118A-B. This margin of error can be set based on the image resolution and/or desired accuracy as is known in the art.

Figure 12A:
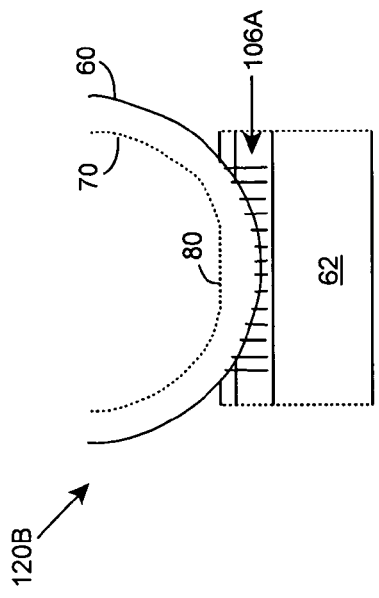
FIGS. 12A-D show how intersection height lines can be compared between images of a rail wheel.

Further, defect module 46 (FIG. 1) can determine whether one or more defects are present in rail wheel 60 (FIG. 2) based on differences in measurements between the various images. For example, FIGS. 12A-D show how intersection height lines 106A-B can be compared between images 120A-D of rail wheel 60. Initially, as shown in FIG. 12A, measurement module 44 (FIG. 1) can extract a group of intersection height lines 106A from an image 120A. In one embodiment, the group of intersection height lines 106A is extracted from an initial image 120A of rail wheel 60 although any image 120A-D can be used.

Figure 12B:
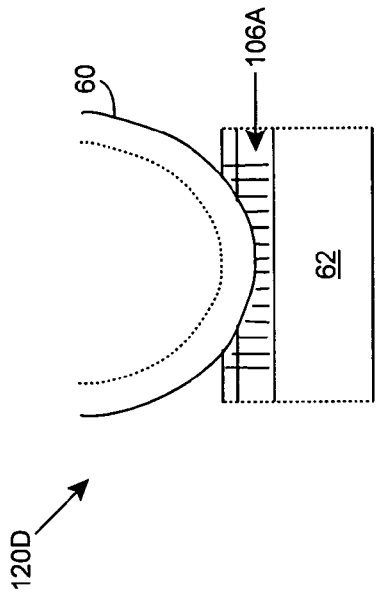
Figure 12C:
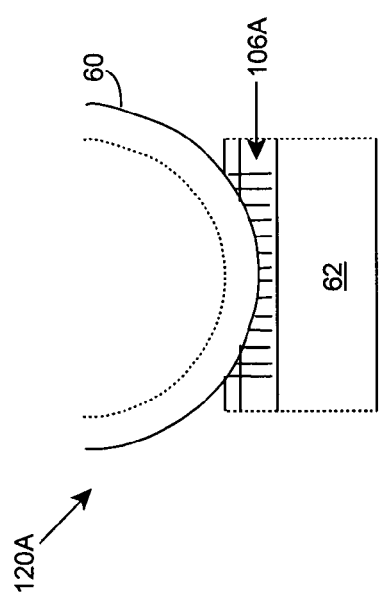

In any event, defect module 46 can compare the extracted intersection height lines 106A with another image 120B-D (FIGS. 12B-D) of rail wheel 60 to detect the presence of one or more defects in rail wheel 60. For example, defect module 46 can detect the presence of a flat spot in rail wheel 60. In general, a flat spot on tread surface 70 (FIG. 2) amounts to a shallow chord removed from an otherwise circular profile of tread surface 70, and thus causes a variation in the height of rail wheel 60. To this extent, FIG. 12B shows a comparison between the group of intersection height lines 106A and another image 120B of rail wheel 60 that includes a flat spot 80 on its tread surface 70 (FIG. 2). In this case, when flat spot 80 on tread surface 70 contacts rail 62, rail wheel 60 drops lower than other locations of tread surface 70, such as that in image 120A. As a result, intersection height lines 106A are higher than the actual profile of rail wheel 60. Similarly, FIG. 12C shows a comparison between a group of intersection height lines 106B that were generated from image 120B and another image 120C of rail wheel 60. In this case, the group of intersection height lines 106B are lower than the profile of rail wheel 60 in image 120C since they were generated when flat spot 80 on tread surface 70 was aligned with rail 62 in image 120B.

Figure 12D:
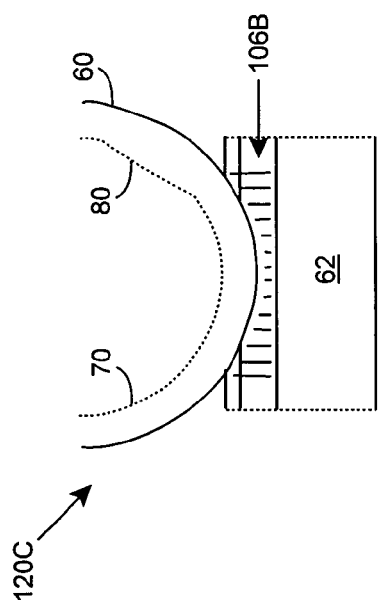

Further, defect module 46 (FIG. 1) can detect when rail wheel 60 includes an out-of-round defect. To this extent, FIG. 12D shows a comparison between the group of intersection height lines 106A extracted from image 120A and another image 120D of rail wheel 60. In this case, while the intersection height lines 106A in the center of rail wheel 60 align well with the profile of rail wheel 60, the intersection height lines 106A on the outer portions of rail wheel 60 are lower than the actual profile of wheel 60. This is due to the fact that the profile of rail wheel 60 in image 120D is more elongated than the profile of rail wheel 60 in image 120A. As a result, rail wheel 60 is out-of-round. It is understood that FIGS. 12A-D are only illustrative. For example, defect module 46 can also detect an out-of-round rail wheel 60 when the outermost intersection height lines 106A are higher than the actual profile of rail wheel 60.

Additionally, defect module 46 (FIG. 1) can detect one or more other types of defects in rail wheel 60. For example, when at least some of gauge side 66 (FIG. 2), field side 64 (FIG. 2), and/or tread surface 70 (FIG. 2) of rail wheel 60 are illuminated and imaged, defect module 46 can detect defects such as a crack and/or gouge in flange 72 (FIG. 2), a crack and/or gouge in field side rim face 68 (FIG. 2) and/or gauge side rim face 74 (FIG. 2), a crack, gouge, and/or shelling on tread surface 70, and the like. Defect module 46 can detect one or more of these defects using any solution, such as edge and shape detection (e.g., variance of brightness and contrast over set distances) on one or more images of rail wheel 60 together with matching with known shapes and profiles, and the like. Further, when the image(s) include other portions of rail wheel 60 (e.g., plate, hub, etc.), defect module 46 can detect defects on these portions of rail wheel 60 in a similar fashion. Still further, defect module 46 can combine multiple images of rail wheel 60 to generate a three-dimensional model of rail wheel 60 by extracting a distance from the corresponding imaging device 96 (FIG. 4) for various locations on rail wheel 60. By generating a three-dimensional model of flange 72, the detection and/or measurement of defects, such as a flat spot, is made more reliable and robust due to an ability to examine the three-dimensional image and detect gouges and nicks that also cause variations in the profile of rail wheel 60 and can mimic a flat spot or other defect in tread surface 70. Further, the three-dimensional model can be used to perform other operations on rail wheel 60, such as one or more required measurements.

Regardless, when defect module 46 (FIG. 1) detects the presence of one or more defects in rail wheel 60, status module 48 (FIG. 1) can determine an operational status of rail wheel 60, e.g., whether rail wheel 60 is safe for continued operation. To this extent, status module 48 can determine a size/severity of the defect and compare the size/severity to a level that is acceptable for continued operation of rail wheel 60. When the defect exceeds an acceptable level, status module 48 can indicate that rail wheel 60 is unsafe for continued operation. Further, when the defect is within an acceptable, but high range, status module 48 can generate a warning regarding the use of rail wheel 60 and an additional inspection, manual (e.g., visual) or computer-assisted, can be made to ensure that rail wheel 60 continues to be safe for continued operation.

For example, status module 48 (FIG. 1) can determine a size of a flat spot on rail wheel 60 based on a distance between a low point of the rail wheel 60 for the flat spot and a low point for one or more other locations on rail wheel 60. To this extent, status module 48 can determine a vertical distance between lines 118A-B of FIG. 11B, a vertical distance between the locations of minimum heights 116A-D in FIG. 11B, a vertical distance between a top of one or more intersection height lines 106A-B of FIGS. 12A-D and the actual profile of rail wheel 60, or the like. The size of the flat spot can then be determined based on a diameter of rail wheel 60 and the distance. The table below illustrates an expected change in vertical location for a flat spot of a particular size on a rail wheel 60 having a thirty-two inch diameter.

| Size of flat spot (inches) | Change in vertical location (inches) |
|---|---|
| 0.5 | <0.0040 |
| 1.0 | 0.0078 |
| 1.5 | 0.0176 |
| 2.0 | 0.0313 |
| 2.5 | 0.0489 |
| 3.0 | 0.0705 |

Further, status module 48 can determine the size of a flat spot using one or more other solutions. For example, a speed of rail wheel 60 can be determined by detection module 32 and/or calculated using interval calculations as rail wheel 60 moves across distance R (FIG. 6). Subsequently, status module 48 can calculate a length of time that a change in vertical location persists, as a longer length of time corresponds to a larger flat spot in a readily calculable relationship. In any event, status module 48 can average the size of the flat spot determined using two or more solutions.

Additionally, status module 48 (FIG. 1) can determine a size/severity of an out-of-round rail wheel 60. To this extent, FIGS. 13A-B show one solution for determining a size/severity of the out-of-round defect. In FIG. 13A, a group of intersection height lines 106 is extracted from an image 120 for rail wheel 60 as discussed elsewhere herein. Subsequently, status module 48 can process the group of intersection height lines 106 using nonlinear regression or the like to generate a curve 122 shown in FIG. 13B that estimates the profile of rail wheel 60. Curve 122 can be compared to a curve 124 of a known "good" rail wheel 60 using nonlinear regression or the like. Curve 124 can comprise a theoretical curve (e.g., a portion of a circle) or be generated as part of a calibration/set up process that extracts a group of intersection height lines 106 and generates curve 124 in a similar manner for a sample rail wheel 60. In any event, status module 48 can determine a size/severity of an out-of-round rail wheel 60 based on a difference between curves 122, 124. Status module 48 can further implement an advanced artificial intelligence and/or expert system approach to automatically classify one or more detected defects, such as a crack and/or gouge in flange 72 (FIG. 2), a crack and/or gouge in field side rim face 68 (FIG. 2) and/or gauge side rim face 74 (FIG. 2), a crack, gouge, and/or shelling on tread surface 70, and the like, through pattern/object recognition, artificial neural networks, fuzzy logic systems, and/or the like.

Returning to FIG. 4, environment 10A can be implemented to measure rail wheels 60 while in operation, e.g., supporting a locomotive, rail car, or the like. In this case, when a typical spacing of ties 92A-D is used, rail 62 and/or enclosure 90 may move, thereby making accurate measurements more difficult to obtain. For example, FIG. 14A shows rail 62 when supporting a rail wheel 60 of a standard load during normal operation. In general, during normal operation, loads of over 100,000 pounds are frequently distributed over the axles of a rail car. Such loads result in considerable downward pressure being transmitted onto rail 62 through each rail wheel 60. With a normal spacing T between ties, e.g., a few feet, rail 62 can bend significantly. A typical bend of rail 62, shown exaggerated in FIG. 14A, can be approximately a quarter of an inch (i.e., approximately 250 mils). Additionally, FIG. 14B shows rail 62 and ties 92A-B supported by ballast 126. In general, ballast 126 comprises gravel, rock, and other components of a soil-gravel type. When wheel 60 supporting a normal load moves along rail 62, the ballast 126 underneath can temporarily compress, causing ties 92A-B, rail 62, and rail wheel 60 to move lower by a distance B.

Without accounting for and/or reducing movement due to rail 62 bending and/or ballast 126 compressing, smaller defects cannot be detected. In one embodiment, environment 10A (FIG. 4) includes a measurement platform that substantially reduces such movement. To this extent, FIG. 15 shows an illustrative measurement platform 130 according to an embodiment of the invention. Measurement platform 130 comprises a segment of rail 62 that is supported by closely spaced ties 92A-B, which are supported by a concrete support slab 132. Measurement platform 130 comprises a length of at least one circumference R of rail wheel 60. In one embodiment, the spacing T' between ties 92A-B is sufficient to reduce the bending of rail 62 due to a standard load supported by rail wheel 60 to less than two mils (1/500 inch), which will enable the identification of a flat spot of an approximately one-half inch size on a thirty-two inch diameter rail wheel 60. To this extent, spacing T' can comprise approximately six inches or less, which will result in no appreciable flexing of rail 62 under a normal load. Similarly, slab 132 can comprise a sufficient thickness C to substantially reduce any compression under a normal load. To this extent, slab 132 can comprise a thickness C of at least one foot. It is understood that other tie spacing T' and/or slab 132 thickness C can be used based on a maximum load of rail wheels 60.

Measurement platform 130 can comprise a standard, well-characterized segment of rail 62. Alternatively, measurement platform 130 can comprise a specially configured segment of rail 62 to enhance the sensitivity of the measurements used to detect a flat spot and/or other types of defects on rail wheel 60. To this extent, FIG. 16 shows a cross-sectional profile of a custom rail segment 62A according to an embodiment of the invention. As shown, rail segment 62A comprises a "pyramid-crown" shape. The pyramid-crown shape includes a pair of opposing substantially vertical/slightly obtuse sides 134A-B, a substantially horizontal top surface 136, which are connected by a pair of angled sides 138A-B. The pyramid-crown shape of rail segment 62A provides a more flat and non-varying course for rail wheel 60 over distance R (FIG. 6) than that provided by a rail having a standard profile, such as rail 62 shown in FIG. 5. Additionally, rail segment 62A can comprise reflective material 102 on a gauge side 134A of rail segment 62A to improve the contrast with rail wheel 60 (FIG. 2) as discussed herein.

Alternatively, returning to FIG. 4, environment 10A can use a standard rail 62, tie 92A-D, and/or ballast 126 (FIG. 14B) configuration. In this case, calibration module 41 (FIG. 1) can calibrate measurement module 44 (FIG. 1) and/or defect module 46 (FIG. 1) to account for any bending/deflection of rail 62. In particular, the bending/deflection of rail 62 can be characterized and factored out of the calculations performed by measurement module 44 and/or defect module 46. To this extent, during calibration, rail wheels 60 having known characteristics and comprising various loads can be imaged by imaging device(s) 96. Based on these images, calibration module 41 can construct one or more functions characterizing the bending/deflection of rail 62 in a known manner. Subsequently, when rail wheel 60 is processed during operation of environment 10A, a general curve of the behavior of rail wheel 60 can be constructed and compared to the one or more functions and a closest-fit curve for the load can be used to compensate for the movement of rail 62. Any remaining differences in rail wheel 60 can then be attributed to one or more defects in rail wheel 60. Further, detection module 32 can measure a load of rail wheel 60 and the measured load can be used to compensate for the movement of rail 62.

Figure 17:
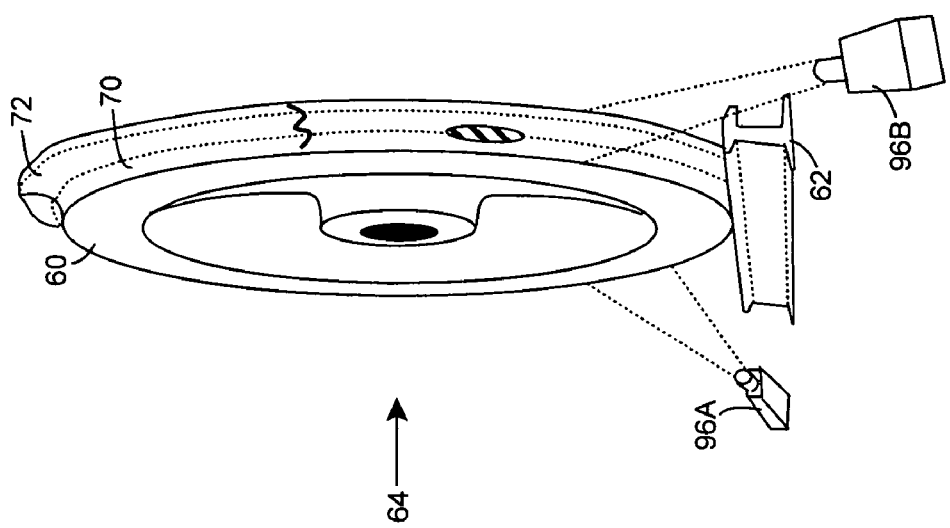
FIG. 17 shows an illustrative configuration of imaging devices for obtaining non-profile image data for a wheel according to an embodiment of the invention.

While environment 10A is shown including various imaging devices 96 configured to obtain profile image data for rail wheel 60 and/or rail 62, it is understood that the invention can incorporate imaging devices 96 configured to obtain image data for various angles with respect to rail wheel 60. For example, FIG. 17 shows an illustrative configuration of imaging devices 96A-B that can be incorporated in an embodiment of the invention. As shown, imaging devices 96A-B are configured to obtain image data for a tread surface 70 and flange 72 of rail wheel 60. It is understood that sufficient imaging devices 96A-B should be included to image the entire tread surface 70 and/or flange 72 of rail wheel 60, e.g., over the entire distance R, shown in FIG. 6. Further, a field of view for each imaging device 96A-B can be configured to enhance the image data obtained for tread surface 70 and/or flange 72.

In any event, image data obtained by imaging devices 96A-B can be used to improve an accuracy with which various attributes of rail wheel 60 can be measured. Additionally, the image data can be used to more accurately detect various defects that may be present on tread surface 70 and/or flange 72 using any appropriate image-processing approach. For example, image processing can be performed to image data obtained for rail wheel 60 and the result(s) can be compared to the image processing result(s) of a known good rail wheel 60. To this extent, FIGS. 18A-B show illustrative images 150A-B of a wheel tread surface without and with a flat spot 152, respectively. Measurement module 44 (FIG. 1) can perform line/edge detection, such as Sobel edge/line detection, on each image 150A-B. FIGS. 19A-B show the resulting images 154A-B, respectively, after applying the Sobel edge/line detection to images 150A-B of FIGS. 18A-B. Subsequently, measurement module 44 can perform an image transform, such as the Radon transform, Hough transform, or the like, on each image 154A-B to generate a graph of each image 154A-B that can be used to detect target features. To this extent, FIGS. 20A-B show illustrative graphs 156A-B that result from performing the Radon transform on each image 154A-B (FIGS. 19A-B), respectively. A comparison of graphs 156A-B can demonstrate one or more differences, such as difference 158, which can be mapped to and/or used to detect one or more defects, such as flat spot 152 (FIG. 18B). FIG. 21 illustrates the relationship between edges in image 154A (FIG. 19A) and the corresponding graph 156A (FIG. 20A).

Returning to FIG. 17, while only imaging devices 96A-B are shown, it is understood that one or more illumination devices 94 (FIG. 4) could be included to improve the image data obtained by imaging devices 96A-B. As shown, imaging devices 96A-B are disposed on field side 64 of rail wheel 60, adjacent to rail 62, however, imaging devices 96A-B can be located in any desirable manner on either side of rail wheel 60. For example, one or more imaging devices 96A-B can be placed adjacent to rail 62 and configured to obtain image data of a wheel plate and/or lower rim area of rail wheel 60 in a substantially vertical orientation. In this case, the image data can be used to identify various wheel flaws, such as a crack, that are visible but not detected using other techniques.

While shown and described herein as a method and system for measuring a wheel, it is understood that the invention further provides various alternative embodiments. For example, in one embodiment, the invention provides a computer-readable medium that includes computer program code to enable a computer infrastructure to evaluate a wheel. To this extent, the computer-readable medium includes program code, such as processing system 30 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a method of generating a system for evaluating a wheel. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process steps of the invention on a subscription, advertising, and/or fee basis. That is, a service provider could offer to evaluate a wheel as described above. In this case, the service provider can manage (e.g., create, maintain, support, etc.) a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Additionally, the terms "module" and "system" are synonymous and mean any combination of hardware and/or software components that perform one or more functions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of evaluating a wheel, the method comprising:
   illuminating a path along which the wheel is anticipated to move, wherein a length of the path is at least one circumference of the wheel and the wheel will rotate at least one full revolution as it moves along the path when operating properly;
   obtaining image data for the wheel as it moves along the path, the image data including data on the wheel as it is located in a plurality of positions along the path, the plurality of positions including two positions on the path that are separated by at least one circumference of the wheel and a plurality of positions between the two positions; and
   measuring at least one attribute of the wheel based on the image data.

2. The method of claim 1, further comprising determining whether at least one defect is present in the wheel based on the image data.

3. The method of claim 2, further comprising determining an operational status of the wheel when at least one defect is present.

4. The method of claim 1, wherein the illuminating step includes projecting a plurality of lines of light onto the path.

5. The method of claim 4, wherein each of the plurality of lines of light is substantially vertical.

6. The method of claim 1, further comprising detecting a presence of the wheel, wherein the illuminating and obtaining step are initiated based on the detected presence.

7. The method of claim 1, further comprising determining a speed of the wheel, wherein at least one of the illuminating and obtaining steps are adjusted based on the speed.

8. The method of claim 1, wherein the obtaining image data step includes emphasizing a vertical dimension of the image data.

9. A system for evaluating a wheel, the system comprising:
   means for illuminating a path along which the wheel is anticipated to move, wherein a length of the path is at least one circumference of the wheel and the wheel will rotate at least one full revolution as it moves along the path when operating properly;
   means for obtaining image data for the wheel as it moves along the path, the image data including data on the wheel as it is located in a plurality of positions along the path, the plurality of positions including two positions on the path that are separated by at least one circumference of the wheel and a plurality of positions between the two positions; and
   means for measuring at least one attribute of the wheel based on the image data.

10. The system of claim 9, further comprising means for determining whether at least one defect is present in the wheel based on the image data.

11. The system of claim 10, further comprising means for determining an operational status of the wheel when at least one defect is present.

12. The system of claim 9, further comprising means for detecting a presence of the wheel, wherein the illuminating and obtaining step are initiated based on the detected presence.

13. The system of claim 9, further comprising means for determining a speed of the wheel, wherein at least one of the illuminating and obtaining steps are adjusted based on the speed.

14. The system of claim 9, wherein the means for obtaining includes means for emphasizing a vertical dimension of the image data.

15. A method of evaluating a rail wheel, the method comprising:
    illuminating a rail segment, wherein a length of the rail segment is at least one circumference of the wheel and the wheel will rotate at least one full revolution as it moves along the rail segment when operating properly;
    obtaining image data for the rail wheel as it moves along the rail segment, the image data including data on the wheel as it is located in a plurality of positions along the rail segment, the plurality of positions including two positions on the rail segment that are separated by at least one circumference of the wheel and a plurality of positions between the two positions; and
    measuring at least one attribute of the rail wheel based on the image data.

16. The method of claim 15, further comprising determining whether at least one defect is present in the rail wheel based on the image data.

17. The method of claim 16, further comprising determining an operational status of the rail wheel when at least one defect is present.

18. The method of claim 16, wherein the at least one defect includes an out-of-roundness defect and a flat spot.

19. A system for evaluating a rail wheel, the system comprising:
    means for illuminating a rail segment, wherein a length of the rail segment is at least one circumference of the wheel and the wheel will rotate at least one full revolution as it moves along the rail segment when operating properly;
    means for obtaining image data for the rail wheel as it moves along the rail segment, the image data including data on the wheel as it is located in a plurality of positions along the rail segment, the plurality of positions including two positions on the rail segment that are separated by at least one circumference of the wheel and a plurality of positions between the two positions; and
    means for measuring at least one attribute of the rail wheel based on the image data.

20. The system of claim 19, further comprising means for determining whether at least one defect is present in the rail wheel based on the image data.

21. The system of claim 20, further comprising means for determining an operational status of the rail wheel when at least one defect is present.

22. The system of claim 19, wherein the means for illuminating and the means for obtaining are installed on a measurement platform that includes:
    a plurality of ties supporting the rail segment, wherein each tie is separated from an adjacent tie by at most six inches; and
    a concrete support slab supporting the plurality of ties, wherein the concrete support slab is at least one foot thick.

23. The system of claim 19, wherein the rail segment includes reflective material.

24. The system of claim 19, wherein the rail segment comprises a pyramid-crown shape.

* * * * *